(12) United States Patent
Kim et al.

(10) Patent No.: US 8,240,906 B2
(45) Date of Patent: Aug. 14, 2012

(54) BACKLIGHT UNIT OF LIQUID CRYSTAL DISPLAY

(75) Inventors: Young-Chan Kim, Incheon (KR); Min-Young Song, Asan-si (KR); Jung-Han Shin, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 59 days.

(21) Appl. No.: 12/971,710

(22) Filed: Dec. 17, 2010

(65) Prior Publication Data

US 2012/0002444 A1   Jan. 5, 2012

(30) Foreign Application Priority Data

Jul. 5, 2010   (KR) .................. 10-2010-0064374

(51) Int. Cl.
*F21V 7/04* (2006.01)
(52) U.S. Cl. ........ 362/615; 362/612; 362/617; 362/619; 439/62; 439/110
(58) Field of Classification Search .................. 362/615, 362/617, 619, 612, 613; 349/62, 65, 110; 345/589
See application file for complete search history.

(56) References Cited

U.S. PATENT DOCUMENTS

| | | | |
|---|---|---|---|
| 7,905,646 B2 * | 3/2011 | Adachi et al. ................. | 362/601 |
| 8,104,944 B2 * | 1/2012 | McCollum et al. ........... | 362/613 |
| 2010/0288614 A1 * | 11/2010 | Ender .......................... | 200/5 A |

FOREIGN PATENT DOCUMENTS

| | | |
|---|---|---|
| JP | 2004-286803 | 10/2004 |
| KR | 1020050021859 | 3/2005 |
| KR | 1020090071488 | 7/2009 |

* cited by examiner

*Primary Examiner* — Ali Alavi
(74) *Attorney, Agent, or Firm* — F. Chau & Associates, LLC

(57) ABSTRACT

Provided is a backlight unit of a liquid crystal display (LCD). The backlight unit includes: a plurality of light guide plates (LGPs) arranged in M layers and separated from each other by a predetermined gap, wherein M is a natural number equal to or greater than two, a light source unit disposed on at least one side surface of each of the LGPs and including N light source blocks whose brightnesses are controlled individually, and wherein N is a natural number equal to or greater than two. The backlight unit further includes a plurality of light output regions defined by each of the LGPs being divided into a plurality of regions according to a distance from the light source unit and by a plurality of light output patterns being formed in some of the regions, and wherein the light output regions do not overlap each other in a stacking direction of the LGPs and are arranged to correspond to a whole surface of the LGPs.

25 Claims, 24 Drawing Sheets

BACKLIGHT UNIT OF LIQUID CRYSTAL DISPLAY

This application claims priority from Korean Patent Application No. 10-2010-0064374 filed on Jul. 5, 2010, the disclosure of which is hereby incorporated by reference herein in its entirety.

BACKGROUND OF THE INVENTION

1. Technical Field

The present disclosure relates to a backlight unit of a liquid crystal display (LCD), and more particularly, to an edge-type backlight unit capable of local dimming.

2. Description of the Related Art

Liquid crystal displays (LCDs) are one of the most widely used types of flat panel displays (FPDs). To display images, an LCD includes a display panel consisting of two substrates having electrodes and a liquid crystal layer interposed between the two substrates. However, as the display panel is a non-luminous element that may not emit light by itself, a backlight unit that provides light to the display panel may be required.

Backlight units are typically classified as either edge-type backlight units and direct-type backlight units according to the position of light source blocks. Light source blocks are located on a side behind a display panel in edge-type backlight units, whereas they are located behind the display panel in direct-type backlight units.

Since there may be a limit to how thin direct-type backlight units can be made, the recent trend toward slimmer LCDs is replacing the direct-type backlight units with edge-type backlight units.

Meanwhile, local dimming is a technology that changes brightnesses of only required regions among a plurality of regions to reduce power consumption of LCDs. The local dimming technology is being developed in various aspects.

For instance, in edge-type backlight units, however, light source blocks are located on a side of an LGP behind a display panel, instead of being located behind the display panel. Thus, light emitted from the light source blocks may be diffused over the whole surface of the LGP. Consequently, this may make it difficult to implement the local dimming technology that controls brightness for each region.

Thus, there is a need in the art for an edge-type backlight unit capable of local dimming.

SUMMARY OF THE INVENTION

Aspects of the present invention may provide a backlight unit which can reduce the thickness and power consumption of a liquid crystal display (LCD).

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a backlight unit including: a plurality of light guide plates (LGPs) arranged in M layers and separated from each other by a predetermined gap, wherein M is a natural number equal to or greater than two, a light source unit disposed on at least one side surface of each of the LGPs and including N light source blocks whose brightnesses are controlled individually, and wherein N is a natural number equal to or greater than two. The backlight unit further includes a plurality of light output regions defined by each of the LGPs being divided into a plurality of regions according to a distance from the light source unit and by a plurality of light output patterns being formed in some of the regions, and wherein the light output regions do not overlap each other in a stacking direction of the LGPs and are arranged to correspond to a whole surface of the LGPs.

According to another aspect of the present invention, there is provided a backlight unit including: a plurality of light guide plates (LGPs) arranged in M layers and separated from each other by a predetermined gap, wherein M is a natural number equal to or greater than two; a first light source unit and a second light source unit disposed respectively on two facing side surfaces of each of the LGPs and each of the first and second light source units including N light source blocks whose brightnesses are controlled individually, and wherein N is a natural number equal to or greater than two. The backlight unit further includes a plurality of light output regions defined by each of the LGPs being divided into a first region close to the first light source unit and a second region close to the second light source unit, by each of the first region and the second region being divided into a plurality of subregions according to a distance from a corresponding one of the first and second light source units, and by a plurality of light output patterns being formed in some of the subregions, and wherein the light output regions do not overlap each other in a stacking direction of the LGPs and are arranged to correspond to a whole surface of the LGPs.

According to another aspect of the present invention, there is provided a backlight unit including: a plurality of light guide plates (LGPs) arranged in M layers and separated from each other by a predetermined gap, wherein M is a natural number equal to or greater than two, a light source unit disposed on at least one side surface of each of the LGPs and including N light source blocks whose brightnesses are controlled individually, and wherein N is a natural number equal to or greater than two. The backlight unit further including a plurality of light guide patterns formed in each of the LGPs and guiding light incident from the light source unit to proceed in a direction perpendicular to the side surfaces of each of the LGPs and a plurality of light output regions defined by each of the LGPs being divided into a plurality of regions according to a distance from the light source unit and by a plurality of light output patterns being formed in some of the regions, and wherein the light output regions do not overlap each other in a stacking direction of the LGPs and are arranged to correspond to a whole surface of the LGPs.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF EXEMPLARY EMBODIMENTS OF THE INVENTION

Figure 1:
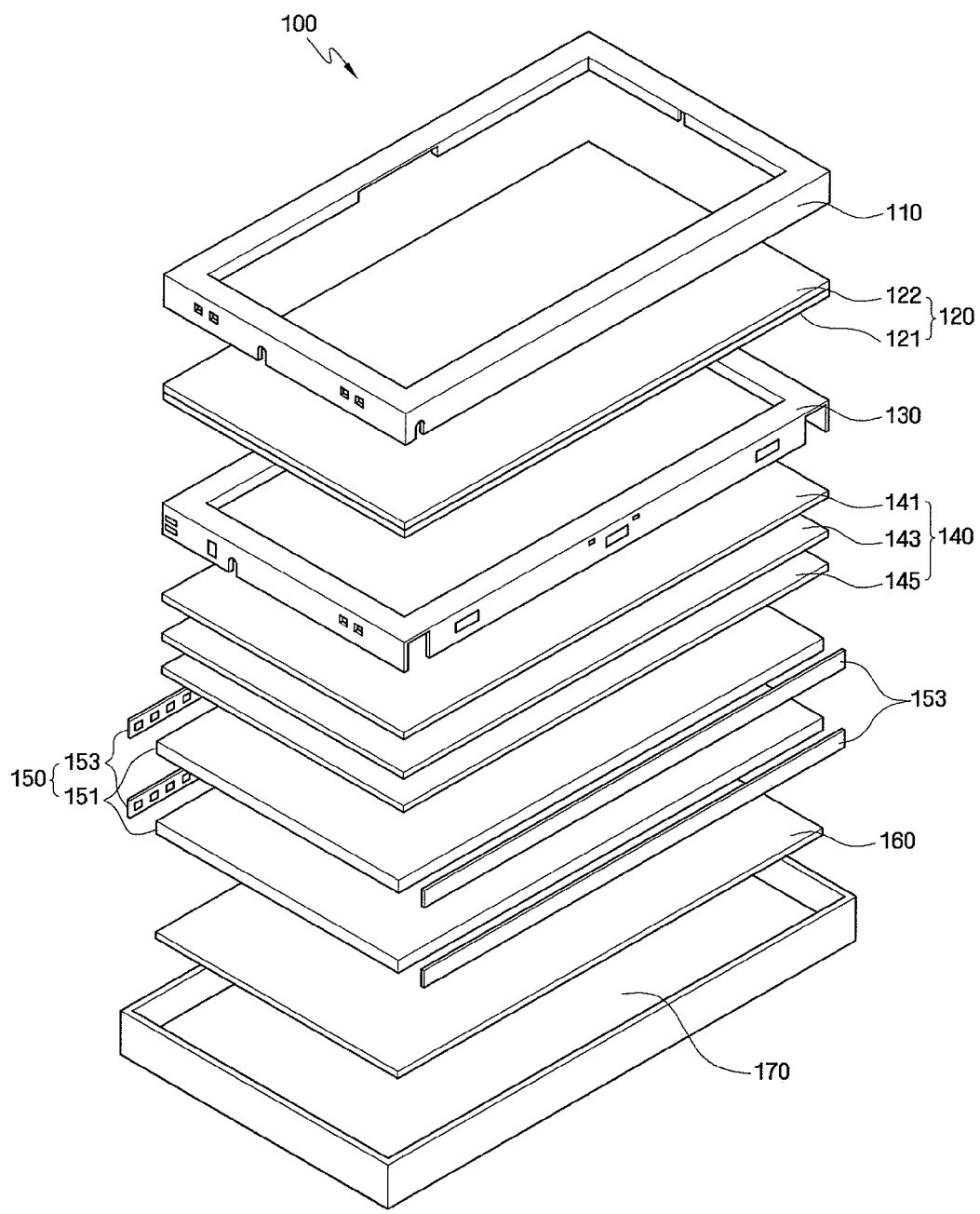
FIG. 1 is an exploded perspective view of a liquid crystal display (LCD) according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. In the drawings, sizes and relative sizes of layers and regions may be exaggerated for clarity.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Hereinafter, exemplary embodiments of the present invention will be described in detail with reference to the attached drawings.

FIG. 1 is an exploded perspective view of a liquid crystal display (LCD) 100 according to an exemplary embodiment of the present invention.

Referring to FIG. 1, the LCD 100 broadly includes a display panel unit 120 which displays images and a backlight unit 150 which provides light to the display panel unit 120. The LCD 100 further includes required optical sheets (indicated by reference numerals 140 and 160) and components (indicated by reference numerals 110, 130 and 170) for fixing or housing the above elements.

For example, the display panel unit 120 includes a lower substrate 121 on which thin-film transistors (TFTs) and pixel electrodes are formed, an upper substrate 122 which faces the lower substrate 121 and on which color filters and a common electrode are formed, and a liquid crystal layer which is interposed between the lower substrate 121 and the upper substrate 122. The liquid crystal layer is driven to display an image on the display panel unit 120. A mold frame 130 is disposed along the edges of the display panel unit 120 to support the display panel unit 120.

The backlight unit 150 is located under the display panel unit 120 and includes light guide plates (LGPs) 151, which deliver light generated by light source blocks to the display panel unit 120, and light source units 153, each being disposed on at least one side surface of each of the LGPs 151 and including a plurality of light source blocks which generate light.

In the backlight unit 150 according to the current exemplary embodiment, two or more LGPs 151 are arranged in different layers, and each of the light source units 153 is disposed on a side surface or both side surfaces of a corresponding one of the LGPs 151. In addition, light output patterns (not shown) for controlling light output regions may be formed in the LGPs 151. Further, light guide patterns (not shown) for guiding the propagation direction of light may be formed in the LGPs 151. These patterns will be described in detail later.

Referring back to FIG. 1, an optical sheet unit 140 is interposed between the backlight unit 150 and the display panel unit 120 to control light output from the LGPs 151. The optical sheet unit 140 includes a diffusion sheet 145 which diffuses light output from the LGPs 151, a prism sheet 143 which refracts and transmits the light diffused by the diffusion sheet 145 toward the display panel unit 120, and a protection sheet 141 which protects the prism sheet 143. The number and arrangement of optical sheets included in the optical sheet unit 140 are not limited to those according to the current exemplary embodiment. When necessary, some of the optical sheets may be omitted or may be provided in multiple numbers, or the order in which the optical sheets are arranged may be reversed.

A reflective sheet 160 is disposed under the backlight unit 150 to reflect light, which fails to proceed to the display panel unit 120, toward the display panel unit 120.

A bottom chassis 170 is disposed under the reflective sheet 160 to house the display panel unit 120, the optical sheet unit 140, the backlight unit 150, the reflective sheet 160, and the like. In addition, a top chassis 110 is disposed on the display panel unit 120. The top chassis 110 has an aperture, which exposes an image display region of the display panel unit 120, and is coupled to the bottom chassis 170.

Hereinafter, backlight units according to exemplary embodiments of the present invention will be described with reference to drawings in which only LGPs and light source units of an LCD are illustrated.

A backlight unit according to an exemplary embodiment of the present invention will briefly be described before a description of the drawings. In the backlight unit, a plurality of LGPs are arranged in different layers, and a light source unit including one or more light source blocks is placed on at least one side surface of each LGP. Here, when the number of light source blocks included in one light source unit is N and when the number of layers of LGPs is M, the entire region of each LGP may be divided as will be described below, and light output patterns are formed in part of the divided region.

When a light source unit is placed on a side of each LGP, each LGP is divided into M regions according to the distance from the light source unit. When light source units are placed respectively on both sides of each LGP, each LGP may be divided into two regions, that is, a first region close to the light source unit on a side surface of each LGP and a second region close to the light source unit on the other side surface thereof, by a center line between the light source units. Each of the first and second regions may be divided again into M regions according to the distance from a corresponding one of the light source units. Ultimately, when light source units are placed respectively on both sides of each LGP, each LGP may be divided into a total of 2M regions.

In the M regions, light output patterns are formed according to the following condition. That is, a plurality of light output patterns are formed in a region selected from the M regions of each LGP. When light source units are placed respectively on both sides of each LGP, the selected region may be a region selected from the M regions of the first region and a region selected from the M regions of the second region. Here, a region of any one LGP, in which light output patterns are formed, in the thickness or stacking direction of the LGPs should not overlap regions of the other LGPs in which light output patterns are formed. Furthermore, when the LGPs are viewed from above, that is, from the display panel unit, the light output patterns should appear to be formed in the whole surface of the LGPs which corresponds to the surface of a display panel unit. That is, the sum of the areas of regions of the LGPs in which the light output patterns are formed should be equal to the area of the whole surface of the LGPs which corresponds to the surface of the display panel unit.

The backlight unit structured as described above may be driven as N×M light-emitting blocks when a light source unit is disposed on a side surface of each LOP. When light source units are disposed respectively on both side surfaces of each LGP, the backlight unit may be driven as N×2M light-emitting blocks. This means, when viewed from the display panel unit, the LGPs as a whole may be divided into N rows and M columns of light-emitting blocks or N rows and 2M columns of light-emitting blocks which provide light respectively to corresponding display blocks of the display panel unit, and the brightnesses of the light-emitting blocks can be controlled individually. In other words, two-dimensional (2D) local dimming is possible.

Figure 2A:
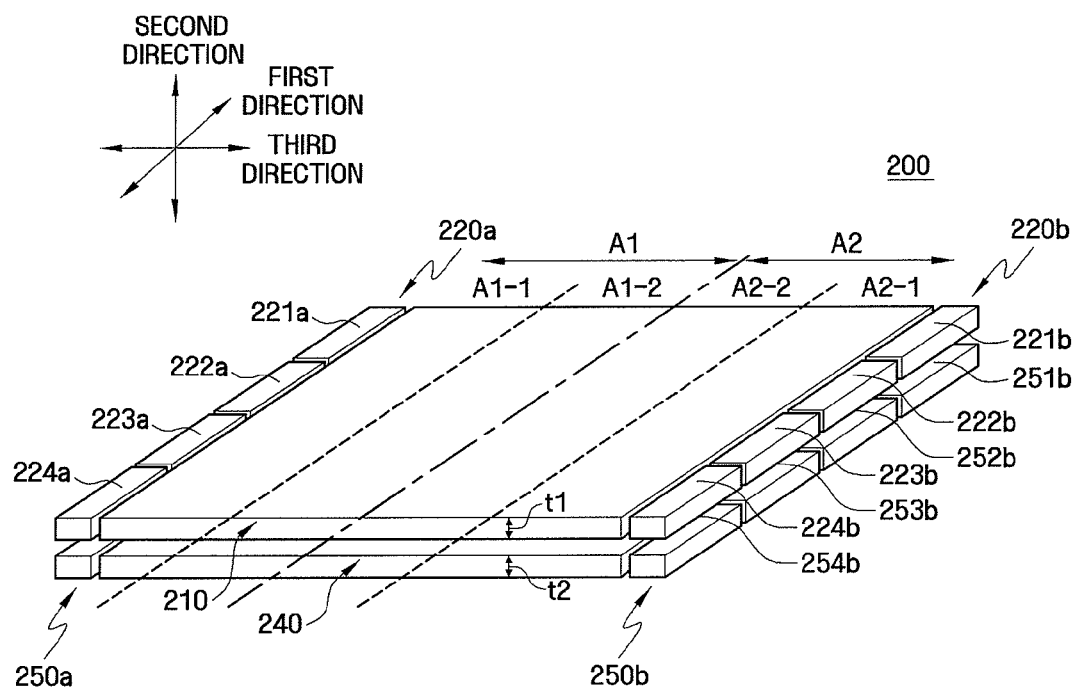
FIGS. 2A through 2C respectively are perspective, side, and plan views of a backlight unit according to an exemplary embodiment of the present invention.
Figure 2B:
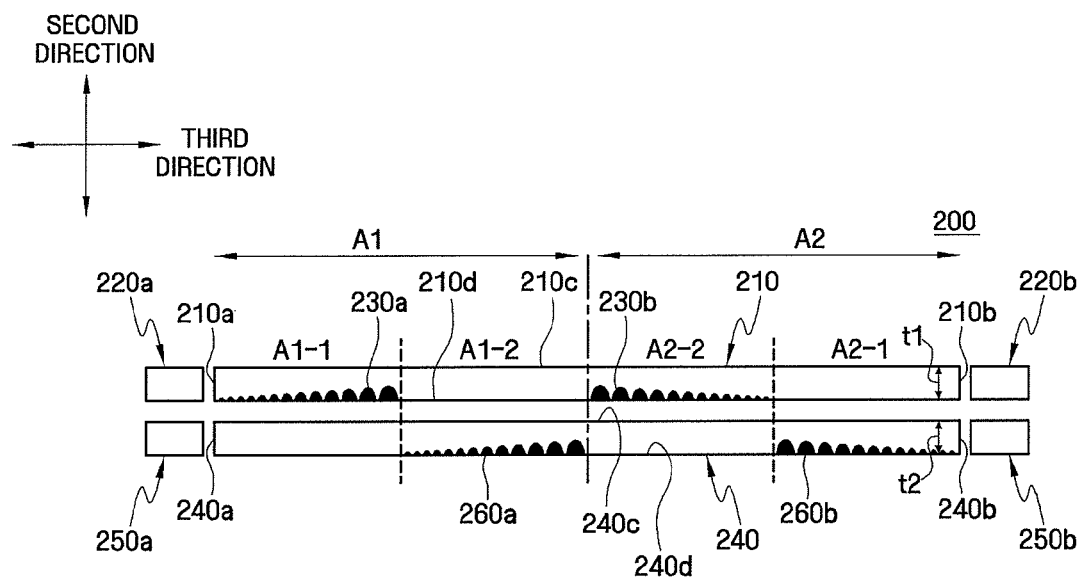
Figure 2C:
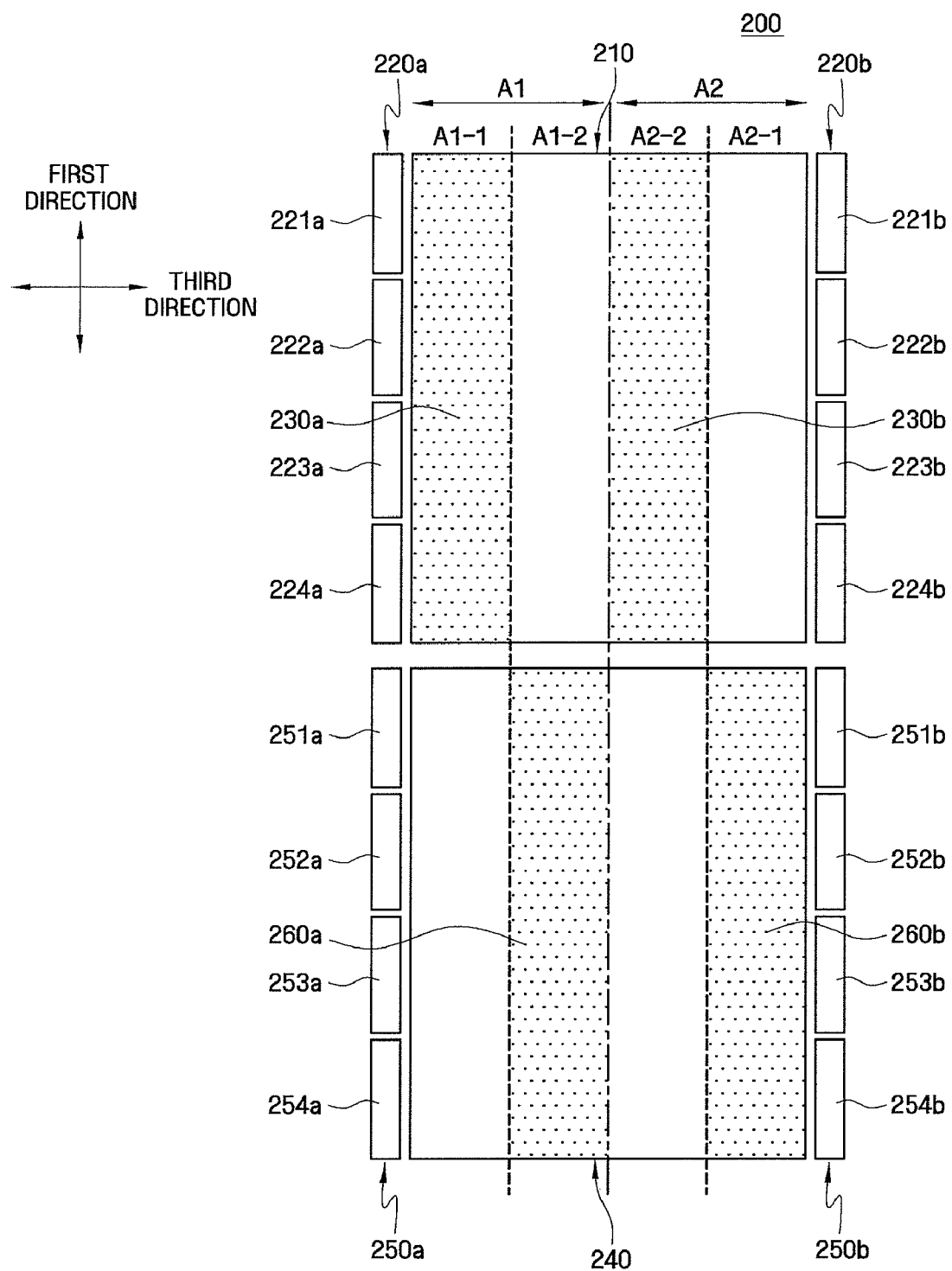

Examples of the backlight unit structured as described above and a local dimming method used by these backlight units will now be described in more detail with reference to FIGS. 2 through 5. In the following drawings, light source units are disposed respectively on both sides of each LGP. However, the present invention is not limited thereto. A description of the following drawings can also be applied to a case where a light source unit is disposed on a side of each LGP. FIGS. 2A through 2C respectively are perspective, side, and plan views of a backlight unit 200 according to a first exemplary embodiment of the present invention. For ease of description, in the plan view of FIG. 2C, LGPs and light source blocks arranged in different layers are illustrated as being located in the same plane to be parallel to each other. In the drawings for the first exemplary embodiment of the present invention, a backlight unit that can be driven as 4×4 light-emitting blocks is illustrated.

Referring to FIGS. 2A through 2C, the backlight unit 200 according to the first exemplary embodiment includes two LGPs arranged in two different layers, that is, an upper LGP 210 and a lower LGP 240, first and second upper light source units 220a and 220b which are placed respectively on both side surfaces of the upper LGP 210, and first and second lower light source units 250a and 250b which are placed respectively on both side surfaces of the lower LGP 240. The upper LGP 210 and the lower LGP 240 overlap each other to appear that only one LGP exists when the LGPs 210 and 240 are viewed from above, that is, from the display panel unit. The upper LGP 210 and the lower LGP 240 are separated from each other by a predetermined gap in a thickness direction (a second direction) of the upper and lower LGPs 210 and 240, and an air gap exists between the upper and lower LGPs 210 and 240.

As described above, the number (M) of layers of LGPs is related to the number (2M) of columns of light-emitting blocks. Thus, the LGPs 210 and 240 are arranged in two layers in the current exemplary embodiment.

In addition, as described above, the number (N) of light source blocks included in one light source unit is related to the number (N) of rows of light-emitting blocks. Thus, in the current exemplary embodiment, each of the light source units 220a, 220b, 250a and 250b includes four light source blocks. That is, the first upper light source unit 220a includes four light source blocks, e.g., first through fourth light source blocks 221a through 224a arranged along a left side surface of the upper LGP 210, and the second upper light source unit 220b includes first through fourth light source blocks 221b through 224b arranged along a right side surface of the upper LGP 210. In addition, the first lower light source unit 250a includes first through fourth light source blocks 251a through 254a arranged along a left side surface of the lower LGP 240, and the second lower light source unit 250b includes first through fourth light source blocks 251b through 254b arranged along a right side surface of the lower LGP 240. For ease of description, the direction in which the light source blocks 221a through 224a, etc. are arranged is defined as a first direction illustrated in the drawings.

Here, light source blocks are defined according to whether they can be driven individually. That is, one light source may form one light source block. Or a plurality of light sources such as, for example, lamps or light-emitting elements may form one light source block if they are driven together.

The upper LGP 210 guides light emitted from the first and second upper light source units 220*a* and 220*b* to a display panel unit disposed above the backlight unit 200. The upper LGP 210 is shaped like a rectangular plate. The upper LGP 210 includes first and second light incident surfaces 210*a* and 210*b* which are adjacent to the first and second upper light source units 220*a* and 220*b* respectively and on which light is incident, a light output surface 210*c* which has both ends connected respectively to the first and second light incident surfaces 210*a* and 210*b* and from which light is output, and a facing surface 210*d* which faces the light output surface 210*c* and has both ends connected respectively to the first and second light incident surfaces 210*a* and 210*b*. Of these surfaces, the light output surface 210*c* and the facing surface 210*d* are widest and serve as front and rear surfaces of the upper LGP 210, respectively. Accordingly, the distance between the light output surface 210*c* and the facing surface 210*d* is equal to a thickness t1 of the upper LGP 210. The thickness t1 may be, for example about 1.5 mm or less.

The lower LGP 240 guides light emitted from the first and second lower light source units 250*a* and 250*b* to the display panel unit and has substantially the same shape as the upper LGP 210. That is, the lower LGP 240 includes first and second light incident surfaces 240*a* and 240*b*, a light output surface 240*c*, and a facing surface 240*d*. A thickness t2 of the lower LGP 240 may be, for example, about 1.5 mm or less. For ease of description, the thickness or stacking direction of the upper and lower LGPs 210 and 240 is defined as a second direction, and a direction perpendicular to the light incident surfaces 210*a* and 210*b*, etc. is defined as a third direction. In addition, a direction parallel to the light incident surfaces 210*a* and 210*b*, etc. is the same as the first direction.

Each of the LGPs 210 and 240 is divided into two regions in the third direction. Of the two regions, the region located on the left side of each of the upper and lower LGPs 210 and 240 is referred to as a first region A1, and the region located on the right side thereof is referred to as a second region A2.

As described above, each of the first region A1 and the second region A2 is divided into a number (M) of regions equal to the number (M) of layers of LGPs in the third direction. Accordingly, in the current exemplary embodiment, each of the first region A1 and the second region A2 is divided again into two subregions in the third direction. Hereinafter, two subregions included in the first region A1 will be indicated by reference characters A1-1 and A 1-2, and two subregions included in the second region A2 will be indicated by reference characters A2-1 and A2-2.

The reason for dividing regions is to form light output patterns. Light output patterns are formed mostly in a facing surface of an LGP and reflect light traveling within the LGP to cause the light to exit from a region of a light output surface which corresponds to a region in which the light output patterns are formed. The light output patterns will be described in detail later with reference to FIGS. 8A through 8F. The region in which the light output patterns are formed will hereinafter be referred to as a light output region. The light output patterns may not necessarily be formed in the facing surface of the LGP. That is, the light output patterns can also be formed in the light output surface of the LGP.

As described above, light output patterns are formed in a subregion, which is selected from subregions of an LGP, according to the following condition. That is, a plurality of light output patterns are formed in one subregion selected from the subregions A1-1 and A1-2 included in the first region A1 of each LGP and in one subregion selected from the subregions A2-1 and A2-2 included in the second region A2 thereof. Here, a region of any one LGP in which light output patterns are formed should not overlap regions of the other LGPs in which light output patterns are formed. Furthermore, when the LGPs are viewed from above, that is, from the display panel unit, regions of LGPs in which light output patterns are formed correspond to the whole surface of the LGPs.

According to the above condition for forming light output patterns, in the current exemplary embodiment, a plurality of first upper light output patterns 230*a* are formed in the subregion A1-1 of the upper LGP 210, a plurality of second upper light output patterns 230*b* are formed in the subregion A2-2 of the upper LGP 210, a plurality of first lower light output patterns 260*a* are formed in the subregion A1-2 of the lower LGP 240, and a plurality of second lower light output patterns 260*b* are formed in the subregion A2-1 of the lower LGP 240. Furthermore, these light output patterns 230*a*, 230*b*, 260*a* and 260*b* are formed in the facing surfaces 210*d* and 240*d* of the upper and lower LGPs 210 and 240.

In the current exemplary embodiment, light output regions (e.g., the subregions A1-1 and A2-2) of the upper LGP 210 do not overlap light output regions (e.g., the subregions A1-2 and A2-1) of the lower LGP 240 in the second direction. Also, the light output patterns 230*a*, 230*b*, 260*a* and 260*b* appear to be formed in the entire surface of the upper and lower LGPs 210 and 240 as a whole. Regions in which light output patterns are formed can be changed as desired as long as the above condition for forming light output patterns is satisfied.

A method of driving the backlight unit 200 structured as described above as 4×4 light-emitting blocks (M=2 and N=4) will now be described in detail with reference to FIGS. 3A and 3B.

Figure 3A:
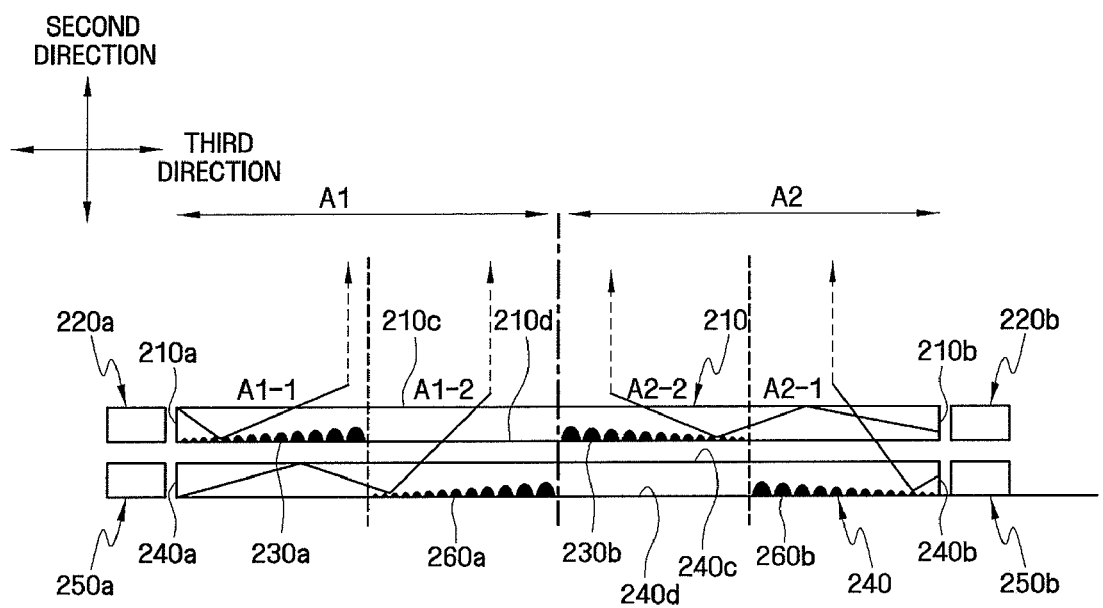
FIGS. 3A and 3B are diagrams illustrating the path of light in the backlight unit according to an exemplary embodiment of the present invention.
Figure 3B:
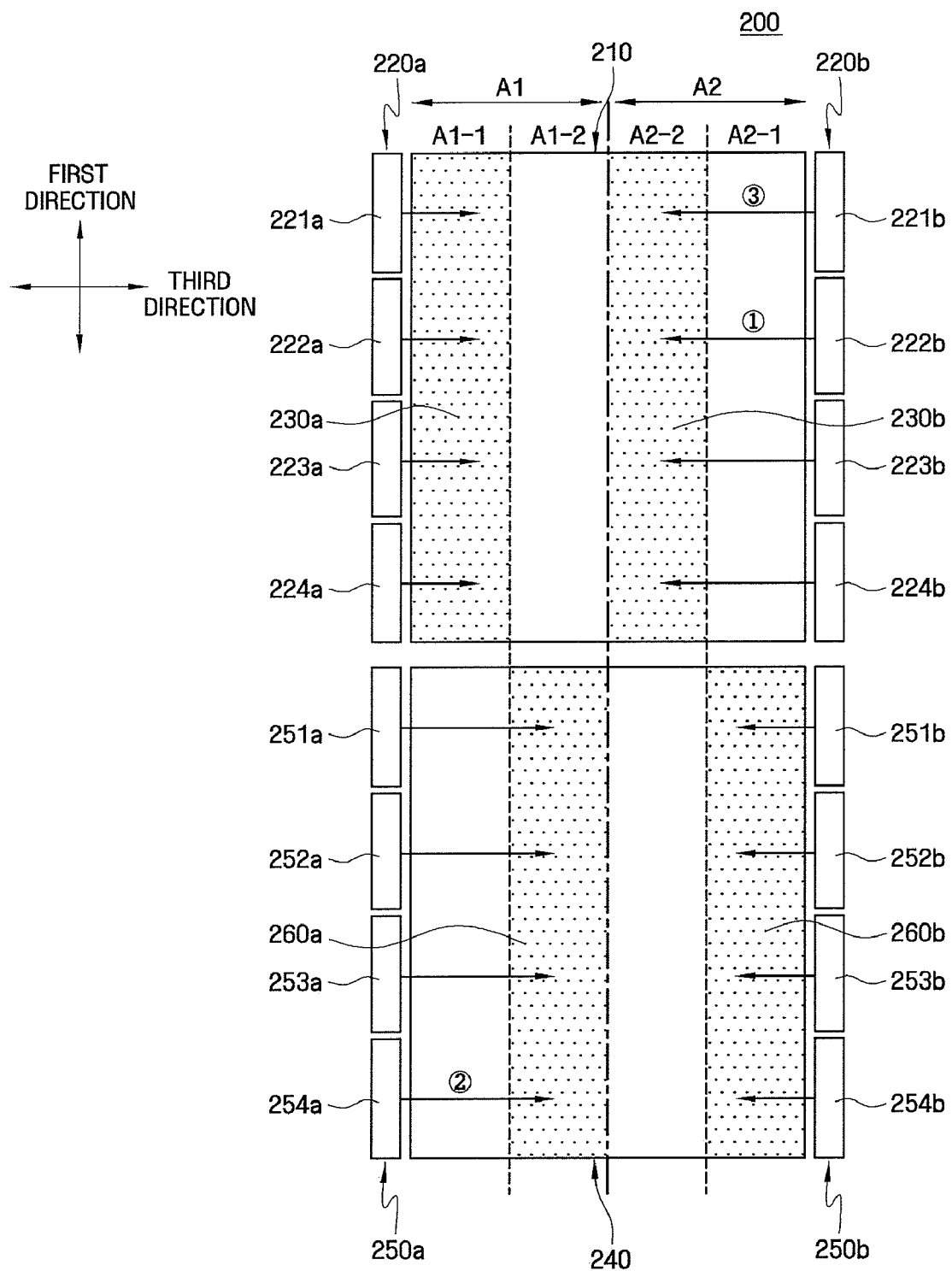

FIGS. 3A and 3B are diagrams illustrating the path of light in the backlight unit 200 according to the first exemplary embodiment of the present invention.

Referring to FIGS. 3A and 3B, when all light source blocks 221*a* through 224*a*, 221*b* through 224*b*, 251*a* through 254*a*, and 251*b* through 254*b* included in the backlight unit 200 are turned on, light emitted from each of the light source blocks 221*a* through 224*a*, 221*b* through 224*b*, 251*a* through 254*a*, and 251*b* through 254*b* proceeds in a direction indicated by an arrow.

For example, rays of light input to the LGPs 210 and 240 proceed mostly in the third direction perpendicular to the light incident surfaces 210*a*, 210*b*, 240*a* and 240*b*. When the rays of light reach the light output patterns 230*a*, 230*b*, 260*a* and 260*b*, they are reflected toward the light output surfaces 210*c* and 240*c*. Accordingly, most of the rays of light traveling within the LGPs 210 and 240 are directed upward (in the direction of the display panel unit positioned above the LGPs 210 and 240) in regions, in which the light output patterns 230*a*, 230*b*, 260*a* and 260*b* are formed, and are output from corresponding regions of the light output surfaces 210*c* and 240*c*. The rays of light output from the light output surfaces 210*c* and 240*c* are made to proceed toward the display panel unit by the above-described optical sheets, as indicated by dotted arrows in FIG. 3A.

In particular, most of rays of light traveling within the LGPs 210 and 240 are directed upward by the light output patterns 230*a*, 230*b*, 260*a* and 260*b* that they reach first. That is, most of rays of light incident from the light source units 220*a* and 250*a* disposed on the left side surfaces of the LGPs 210 and 240 are reflected by the light output patterns 230*a* and 260*a*, which are close to the light source units 220*a* and 250*a*, and are output from corresponding regions of the light output surfaces 210c and 240c. Furthermore, most of rays of light incident from the light source units 220b and 250b disposed on the right side surfaces of the LGPs 210 and 240 are reflected by the light output patterns 230b and 260b, which are close to the light source units 220b and 250b, and are output from corresponding regions of the light output surfaces 210c and 240c. That is, the light source units 220a and 250a disposed on the left side surfaces of the LGPs 210 and 240 may be responsible for the first region A1, and the light source units 220b and 250b disposed on the right side surfaces of the LGPs 210 and 240 may be responsible for the second region A2.

These light paths enable the backlight unit 200 to be driven as 4×4 light-emitting blocks. That is, the LGPs 210 and 240 as a whole are divided into four rows and four columns of light-emitting blocks when viewed from the display panel unit, and the brightness of each of these light-emitting blocks can be controlled individually.

For example, when the second light source block 222b of the second upper light source unit 220b is turned on while the other light source blocks are all turned off, light incident upon the upper LGP 210 from the second light source block 222b may proceed in the third direction, and if it reaches the second upper light output patterns 230b, it may be reflected by the second upper light output patterns 230b and may be output from a corresponding region of the light output surface 210c, as indicated by an arrow ① in FIG. 3B. Accordingly, when viewed from above the LGPs 210 and 240, a light-emitting block located in a second row and a third column may look brighter than the other light-emitting blocks.

In another example, when the fourth light source block 254a of the first lower light source unit 250a and the first light source block 221b of the second upper light source unit 220b are turned on while the other light source blocks are turned off, light incident upon the lower LGP 240 from the fourth light source block 254a may proceed in the third direction and then may be reflected by the first lower light output patterns 260a and may be output from a corresponding region of the light output surface 240c, as indicated by an arrow ② in FIG. 3B. In addition, light incident upon the upper LGP 210 from the first light source block 221b may proceed in the third direction and then may be reflected by the second upper light output patterns 230b and may be output from a corresponding region of the light output surface 210c, as indicated by an arrow ③ in FIG. 3B. Accordingly, when viewed from above the LGPs 210 and 240, only light-emitting blocks located in a fourth row and a second column and a first row and the third column may look bright.

Consequently, light source blocks included in one light source unit, e.g., the light source blocks 221a through 224a included in the first upper light source unit 220a may define rows of light-emitting blocks, and light output regions (e.g., the subregions A1-2 and A2-2) of the upper LGP 210 and light output regions (e.g., the subregions A1-2 and A2-1) of the lower LGP 240 may define columns of the light-emitting blocks. Accordingly, the sixteen light source blocks 221a through 224a, 221b through 224b, 251a through 254a, and 251b through 254b included in the backlight unit 200 correspond respectively to the 4×4 light-emitting blocks, and a light-emitting block may become bright or dark according to the 'on' or 'off' state of a light source block which is responsible for the light-emitting block.

In the current exemplary embodiment, the first through fourth light source blocks 221a through 224a included in the first upper light source unit 220a are sequentially and respectively responsible for light-emitting blocks in the first row and a first column, the second row and the first column, a third row and the first column, and the fourth row and the third column. The first through fourth light source blocks 221b through 224b included in the second upper light source unit 220b are sequentially and respectively responsible for light-emitting blocks in the first row and the third column, the second row and the third column, the third row and the third column, and the fourth row and the third column. The first through fourth light source blocks 251a through 254a included in the first lower light source unit 250a are sequentially and respectively responsible for light-emitting blocks in the first row and the second column, the second row and the second column, the third row and the second column, and the fourth row and the second column. The first through fourth light source blocks 251b through 254b included in the second lower light source unit 250b are sequentially and respectively responsible for light-emitting blocks in the first row and a fourth column, the second row and the fourth column, the third row and the fourth column, and the fourth row and the fourth column.

A case where light source units are located respectively on both sides of each LGP has been described above with reference to FIGS. 2 and 3. However, a light source unit can also be located on only a side of each LGP. In this case, each LGP is not divided into a first region and a second region in the third direction but is divided into only M regions (two regions in the current exemplary embodiment) in the third direction and so the backlight unit is driven as 4×2 light-emitting blocks. Except for these differences, the condition for forming light output patterns and a method of driving a backlight unit in the case where a light source unit is located on only a side of each LGP are substantially the same as those in the case where light source units are located respectively on both sides of each LGP, and thus a detailed description thereof will be omitted.

Figure 14:
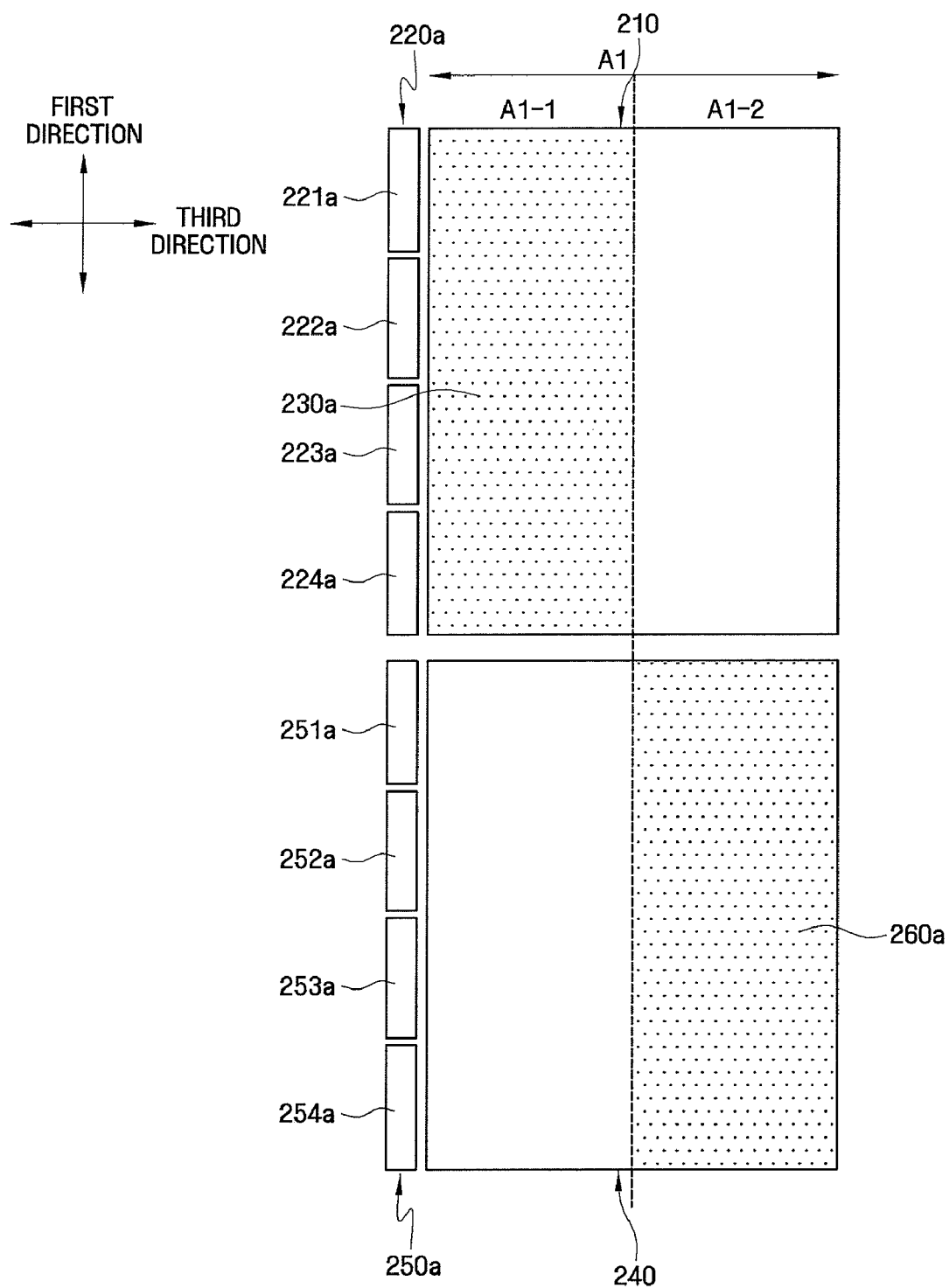
FIG. 14 is a plan view of a backlight unit according to a modified example of an exemplary embodiment of the present invention.

That is, when a light source unit is disposed on a side of each LGP in the backlight unit 200 of FIGS. 2 and 3, that is, when any one of the first and second upper light source units 220a and 220b and any one of the first and second lower light source units 250a and 250b exist, each of the upper and lower LGPs 210 and 240 included in the backlight unit 200 of FIGS. 2 and 3 may have any one of the first and second regions A1 and A2. Accordingly, any one of the first upper and lower light output patterns 230a and 260a may be formed, and any one of the second upper and lower light output patterns 230b and 260b may be formed, as illustrated in FIG. 14.

Figure 4:
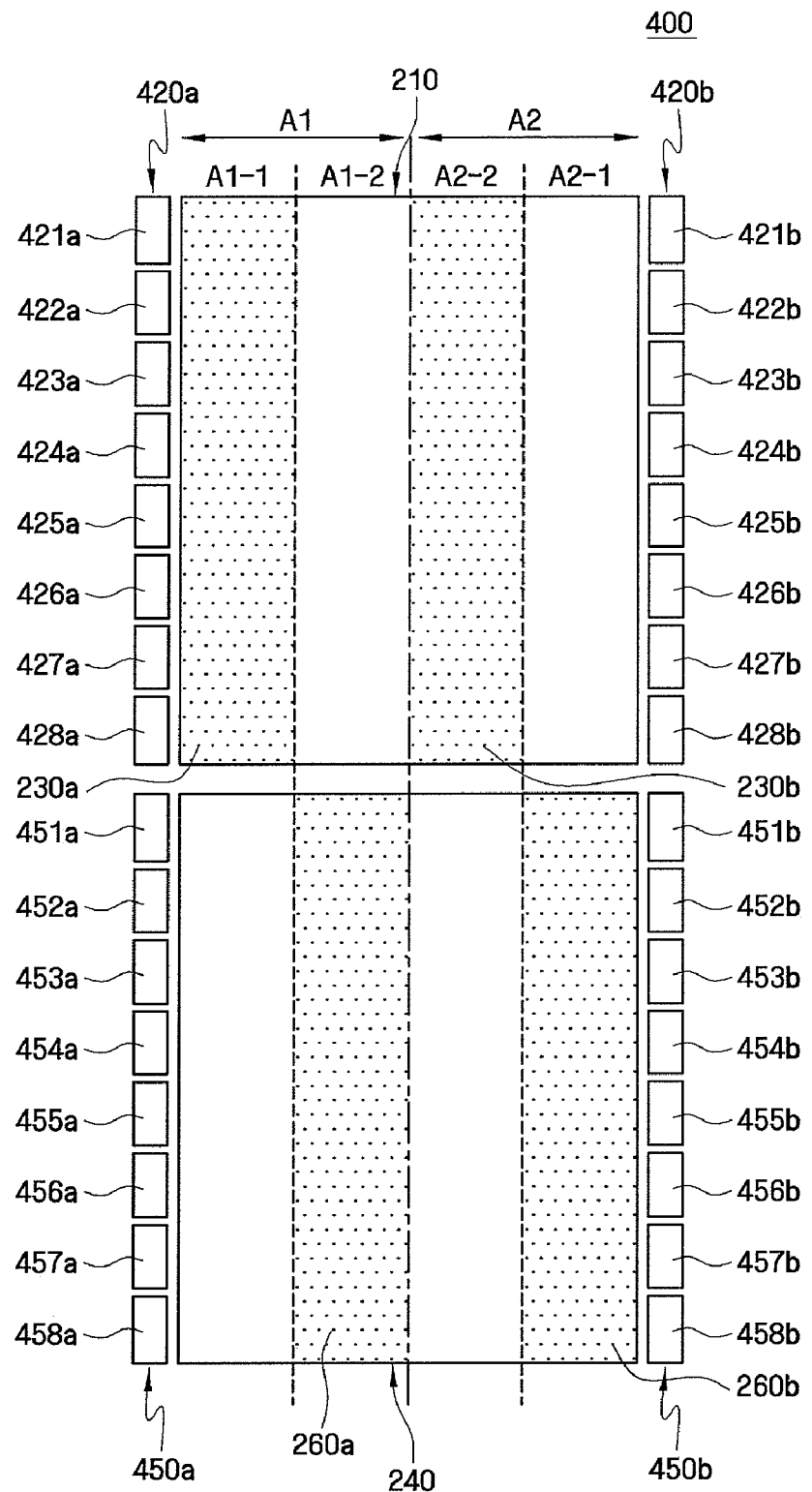
FIG. 4 is a plan view of a backlight unit according to a modified example of an exemplary embodiment of the present invention.

FIG. 4 is a plan view of a backlight unit 400 according to a first modified example of the first exemplary embodiment of the present invention. In the plan view of FIG. 4, LGPs and light source blocks arranged in different layers are, for ease of description, illustrated as being located in the same plane. Also, in the drawing for the current modified example of the first exemplary embodiment of the present invention, the structure of a backlight unit that can be driven as 8×4 light-emitting blocks is illustrated. For simplicity, elements substantially identical to those of the first exemplary embodiment are indicated by like reference numerals, and thus their description will be omitted.

Referring to FIG. 4, the backlight unit 400 according to the current modified example of the first exemplary embodiment is the same as the backlight unit 200 according to the first exemplary embodiment, except that the number (N) of light source blocks included in one light source unit is changed from four to eight. That is, the only difference between the first exemplary embodiment and the current example of the first exemplary embodiment is the number (N) of rows of light-emitting blocks.

Thus, LGPs 210 and 240 arranged in two layers and regions of the LGPs 210 and 240 in which light output patterns 230a, 230b, 260a and 260b are formed are the same as those according to the first exemplary embodiment.

In the current modified example, each of light source units 420a, 420b, 450a and 450b disposed on both sides of the LGPs 210 and 240 includes eight light source blocks. That is, the first upper light source unit 420a includes first through eighth light source blocks 421a through 428a arranged along a left side surface of the upper LGP 210, and the second upper light source unit 420b includes first through eighth light source blocks 421b through 428b arranged along a right side surface of the upper LGP 210. Furthermore, the first lower light source unit 450a includes first through eighth light source blocks 451a through 458a arranged along a left side surface of the lower LGP 240, and the second lower light source unit 450b includes first through eighth light source blocks 451b through 458b arranged along a right side surface of the lower LGP 240.

As described above, eight light source blocks included in one light source unit, for example, the first through eighth light source blocks 421a through 428a included in the first upper light source unit 420a respectively define rows of light-emitting blocks. Thus, the backlight unit 400 according to the current modified example can be driven as 8×4 light-emitting blocks.

Figure 5A:
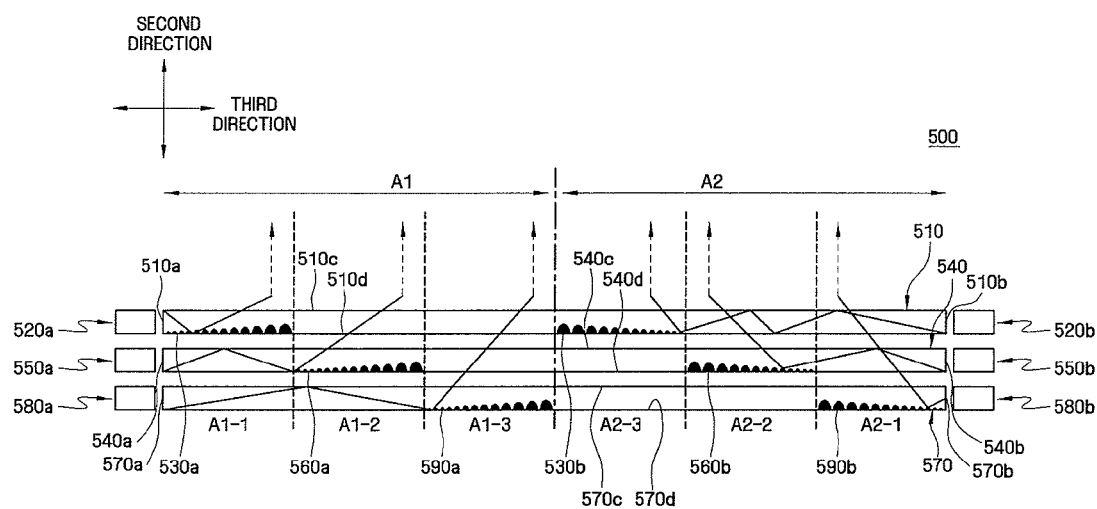
FIGS. 5A and 5B respectively are side and plan views of a backlight unit according to another modified example of an exemplary embodiment of the present invention.
Figure 5B:
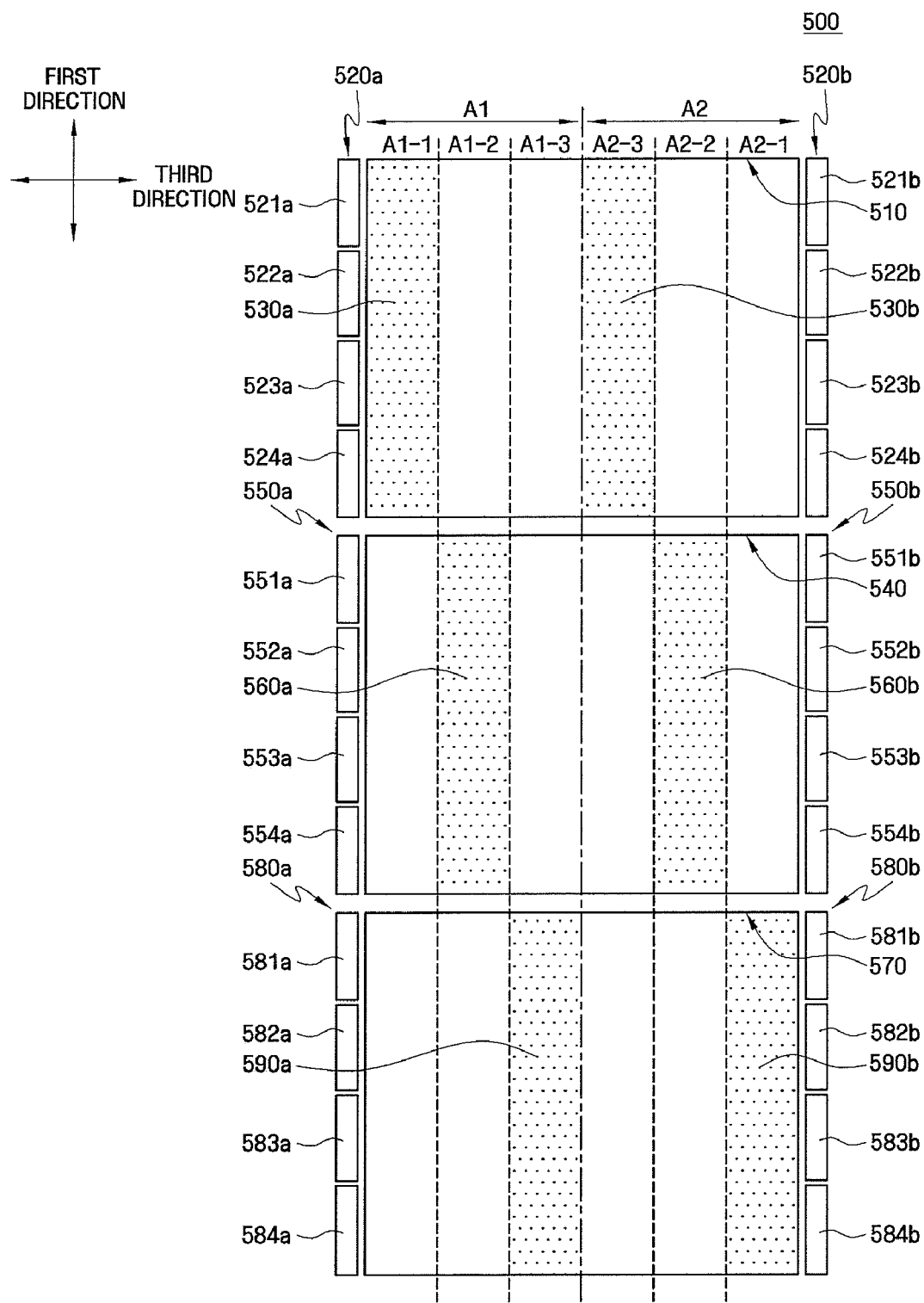

FIGS. 5A and 5B respectively are side and plan views of a backlight unit 500 according to a second modified example of the first exemplary embodiment of the present invention. In the plan view of FIG. 5B, LGPs and light source blocks arranged in different layers are, for ease of description, illustrated as being located in the same plane. Also, in the drawings for the current modified example of the first exemplary embodiment of the present invention, the structure of a backlight unit that can be driven as 4×6 light-emitting blocks is illustrated. A detailed description of elements substantially identical to those of the first exemplary embodiment will be omitted.

Referring to FIGS. 5A and 5B, the backlight unit 500 according to the current modified example of the first exemplary embodiment and the backlight unit 200 according to the first exemplary embodiment are the same in that the number of light source blocks included in one light source unit is four but are different in the number of layers of LGPs and the division of regions for forming light output patterns. These differences between the first exemplary embodiment and the current modified example of the first exemplary embodiment arise from the fact that only the number (2M) of columns of light-emitting blocks has changed from the first exemplary embodiment.

The backlight unit 500 according to the current modified example includes LGPs arranged in three different layers, that is, an upper LGP 510, a middle LGP 540 and a lower LGP 570, and first and second upper light source units 520a and 520b, first and second middle light source units 550a and 550b, and first and second lower light source units 580a and 580b which are disposed on both side surfaces of the upper, middle, and lower LGPs 510, 540 and 570, respectively.

Each of the light source units 520a, 520b, 550a, 550b, 580a and 580b includes four light source blocks as in the first exemplary embodiment. That is, the first upper light source unit 520a includes first through fourth light source blocks 521a through 524a, the second upper light source unit 520b includes first through fourth light source blocks 521b through 524b, the first middle light source unit 550a includes first through fourth light source blocks 551a through 554a, the second middle light source unit 550b includes first through fourth light source blocks 551b through 554b, the first lower light source unit 580a includes first through fourth light source blocks 581a through 584a, and the second lower light source unit 580b includes first through fourth light source blocks 581b through 584b.

As the number (2M) of columns of light-emitting blocks is six in the current modified example, the LGPs 510, 540 and 570 are arranged in three different layers. In addition, each of the LGPs 510, 540 and 570 is divided into a first region A1 which is located on a left side thereof in the third direction and a second region A2 which is located on a right side thereof in the third direction.

Here, each of the first region A1 and the second region A2 is divided into three regions equal to the number of layers of LGPs in the third direction. Hereinafter, three subregions included in the first region A1 will be indicated by reference characters A1-1, A1-2 and A1-3, and three subregions included in the second region A2 will be indicated by reference characters A2-1, A2-2 and A2-3.

In a subregion selected from these subregions, a plurality of light output patterns are formed according to the above-described condition for forming light output patterns. That is, in the current modified example, a plurality of first upper light output patterns 530a and a plurality of second upper light output patterns 530b are formed respectively in the subregions A1-1 and A2-3 of the upper LGP 510, a plurality of first middle light output patterns 560a and a plurality of second middle light output patterns 560b are formed respectively in the subregions A1-2 and A2-2 of the middle LGP 540, and a plurality of first lower light output patterns 590a and a plurality of second lower light output patterns 590b are formed respectively in the subregions A1-3 and A2-1 of the lower LGP 570. Furthermore, the light output patterns 530a, 530b, 560a, 560b, 590a and 590b are formed in facing surfaces 510d, 540d, and 570d of the LGPs 510, 540 and 570.

According to the current modified example, light output regions (e.g., the subregions A1-1 and A2-3) of the upper LGP 510, light output regions (e.g., the subregions A1-2 and A2-2) of the middle LGP 540, and light output regions (e.g., the subregions A1-3 and A2-1) of the lower LGP 570 do not overlap each other in the second direction but, when viewed from above, appear to be formed on the whole surface of the upper, middle and lower LGPs 510, 540 and 570 as a whole. However, the present invention is not limited to the current modified example. Regions in which light output patterns are formed can be changed as desired as long as the above condition for forming light output patterns is satisfied.

The light output patterns 530a, 530b, 560a, 560b, 590a and 590b formed as described above may cause rays of light incident on the LGPs 510, 540, and 570 to propagate in paths indicated by arrows in FIG. 5A. This denotes that regions of the LGPs 510, 540 and 570, in which the light output patterns 530a, 530b, 560a, 560b, 590a and 590b are formed, respectively define six columns of light-emitting blocks. Therefore, the backlight unit 500 according to the current modified example can be driven as 4×6 light-emitting blocks.

In the current modified example, if a light source unit is disposed only on a side of each LGP, that is, if any one of the first and second upper light source units 520a and 520b, any one of the first and second middle light source units 550a and 550b, and any one of the first and second lower light source units 580a and 580b exist, it is apparent to one skilled in the art from the above descriptions that each of the upper, middle and lower LGPs 510, 540 and 570 has any one of the first and second regions A1 and A2. Accordingly, any one of the first upper, middle and lower light output patterns 530a, 560a and 590a are formed, and any one of the second upper, middle and lower light output patterns 530b, 560b and 590b are formed. Consequently, the backlight unit 500 can be driven as 4×3 light-emitting blocks (M=3 and N=4). A detailed description of this fact and relevant drawings will be omitted.

Meanwhile, a backlight unit having the following structure can be used instead of the backlight units 200 through 500 according to the embodiments of FIGS. 2 through 5. That is, a backlight unit according to another exemplary embodiment of the present invention may include a plurality of LGPs arranged in M different layers, and a light source unit including N light source blocks is disposed on one side surface or both side surfaces of each of the LGPs. Here, when a light source is placed on a side of each LGP, each LGP may be divided into M regions according to the distance from the light source unit. When light source units are placed respectively on both sides of each LGP, each LGP may be divided into two regions, that is, a first region close to the light source unit on a side surface of each LGP and a second region close to the light source unit on the other side surface thereof, by a center line between the light source units, and each of the first and second regions may be divided again into M regions according to the distance from a corresponding one of the light source units. Up to this point, the backlight unit according to the current exemplary embodiment is the same as the backlight units 200 through 500 according to the previous embodiments.

In the current exemplary embodiment, however, each LGP may be further divided into N regions, which correspond respectively to light source blocks included in one light source unit, in a direction (e.g., the first direction) parallel to the direction in which the light source blocks are disposed. The N regions will hereinafter be referred to as first through $N^{th}$ light source block corresponding regions. Consequently, when a light source is placed on a side of each LGP, each LGP may be divided into N rows and M columns of regions arranged in a checkerboard form. When light source units are placed respectively on both sides of each LGP, each LGP may be divided into N rows and 2M columns of regions arranged in a checkerboard form.

In the regions arranged in a checkerboard form, light output patterns may be formed according to the following condition. That is, a plurality of light output patterns may be formed in an overlapping region of a region selected from the M regions of each LGP and a $t^{th}$ light source block corresponding region. When light source units are placed respectively on both sides of each LGP, the selected region may be a region selected from the M regions of the first region and a region selected from the M regions of the second region. Here, t may have a value ranging from 1 to N.

As described above, a light output region of any one LGP should not overlap light output regions of the other LGPs. Also, when the LGPs are viewed from above, that is, from the display panel unit, the light output patterns should appear to be formed in the whole surface of the LGPs which corresponds to the surface of a display panel unit.

The backlight unit structured as described above may be driven as N×M light-emitting blocks when a light source unit is disposed on a side surface of each LGP. When light source units are disposed respectively on both side surfaces of each LGP, the backlight unit may be driven as N×2M light-emitting blocks. Examples of this backlight unit structured as described above and a local dimming method used by these backlight units will now be described in more detail with reference to FIGS. 6 and 7. In the following drawings, light source units are disposed respectively on both sides of each LGP. However, the present invention is not limited thereto. A description of the following drawings can also be applied to a case where a light source unit is disposed on a side of each LGP.

Figure 6:
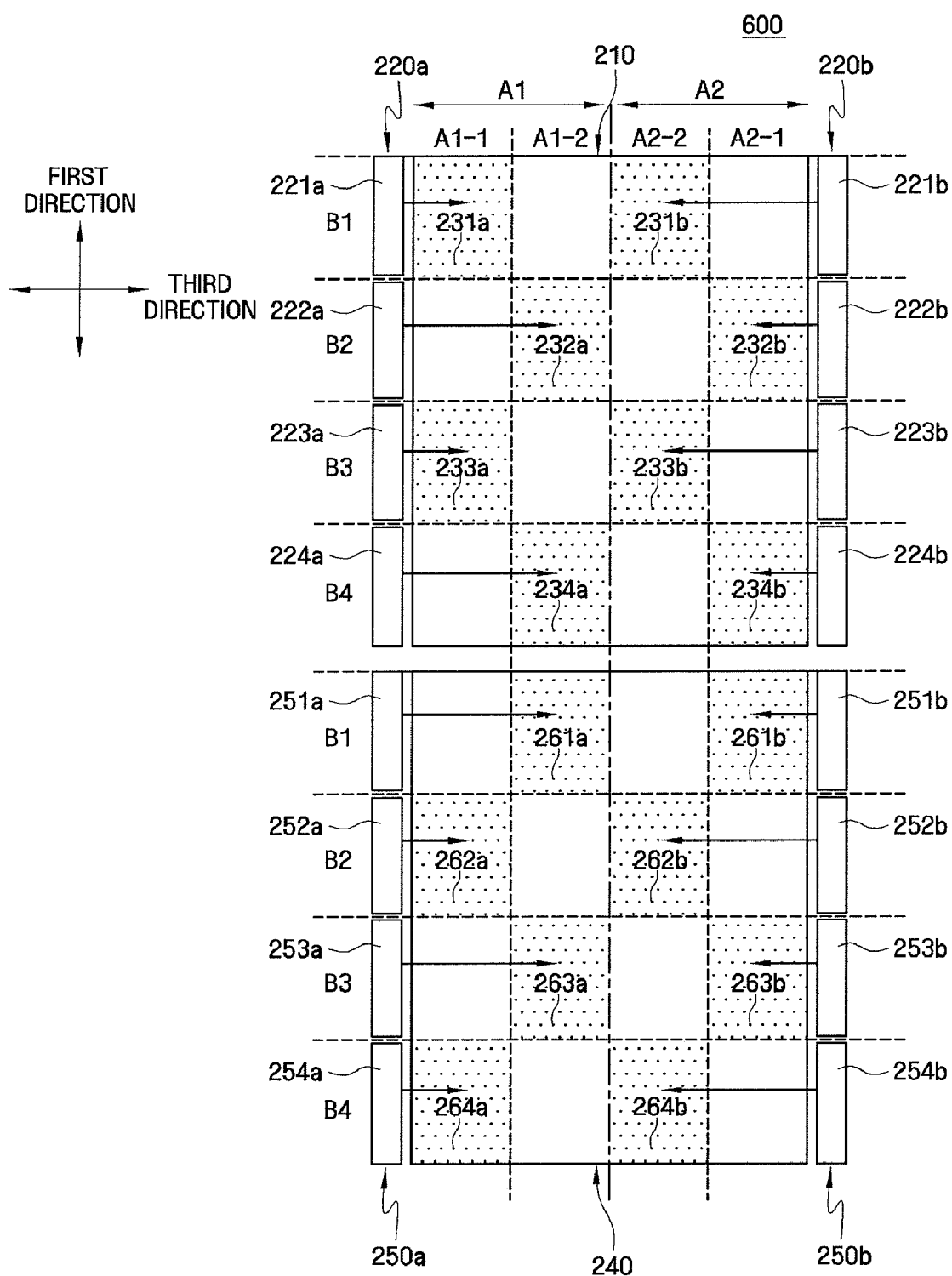
FIG. 6 is a plan view of a backlight unit according to an exemplary embodiment of the present invention.

FIG. 6 is a plan view of a backlight unit 600 according to a second exemplary embodiment of the present invention. In the plan view of FIG. 6, LGPs and light source blocks arranged in different layers are, for ease of description, illustrated as being located in the same plane. As in the drawings for the first exemplary embodiment, in the drawing for the second exemplary embodiment of the present invention, the structure of a backlight unit that can be driven as 4×4 light-emitting blocks is illustrated. For simplicity, elements substantially identical to those of the first exemplary embodiment are indicated by like reference numerals, and thus their description will be omitted.

Referring to FIG. 6, the backlight unit 600 according to the second exemplary embodiment has the same structure as the backlight unit 200 according to the first exemplary embodiment, except that each LGP is divided into regions arranged in a checkerboard form and that light output patterns are formed in the regions.

That is, like the backlight unit 200 according to the first exemplary embodiment, the backlight unit 600 according to the second exemplary embodiment includes LGPs 210 and 240 arranged in two layers and light source units 220a, 220b, 250a, and 250b which are disposed on both sides of the LGPs 210 and 240, respectively, wherein each of the light source units 220a, 220b, 250a and 250b includes four light source blocks.

As in the first exemplary embodiment, in the second exemplary embodiment, each of the LGPs 210 and 240 is divided into two regions in the third direction, that is, a first region A1 located on a left side of each of the LGPs 210 and 240 and a second region A2 located on a right side thereof. In addition, each of the first region A1 and the second region A2 is divided again, in the third direction, into a number of regions equal to the number of layers of the LGPs 210 and 240, that is, two subregions A1-1 and A1-2 or two subregions A2-1 and A2-2.

Further, each of the LGPs 210 and 240 is divided, in the first direction, into four regions which correspond respectively to light source blocks included in one light source unit. That is, the upper LGP 210 is divided into first through fourth light source block corresponding regions B1 through B4 which correspond respectively to, e.g., first through fourth light source blocks 221a through 224a included in the first upper light source unit 220a, and the lower LGP 240 is divided into first through fourth light source block corresponding regions B1 through B4 which correspond respectively to, e.g., first through fourth light source blocks 251a through 254a included in the first lower light source unit 250a.

Ultimately, each of the LGPs 210 and 240 is divided into 4 rows and 4 columns regions arranged in a checkerboard form.

In these LGPs 210 and 240, light output patterns are formed according to the above-described condition for foaming light output patterns. That is, a plurality of light output patterns 231a are formed in an overlapping region of a subregion (e.g., A1-1) selected from the two subregions A1-1 and A1-2 included in the first region A1 of the upper LGP 210 and the first light source block corresponding region B1, and a plurality of light output patterns 231b are formed in an overlapping region of a subregion (e.g., A2-2) selected from the two subregions A2-1 and A2-2 included in the second region A2 of the upper LGP 210 and the first light source block corresponding region B1. A plurality of light output patterns 232a are formed in an overlapping region of a subregion (e.g., A1-2) selected from the two subregions A1-1 and A1-2 included in the first region A1 of the upper LGP 210 and the second light source block corresponding region B2, and a plurality of light output patterns 232b are formed in an overlapping region of a subregion (e.g., A2-1) selected from the two subregions A2-1 and A2-2 included in the second region A2 of the upper LGP 210 and the second light source block corresponding region B2. Further, a plurality of light output patterns 233a are formed in an overlapping region of a subregion (e.g., A1-1) selected from the two subregions A1-1 and A1-2 included in the first region A1 of the upper LGP 210 and the third light source block corresponding region B3, and a plurality of light output patterns 233b are formed in an overlapping region of a subregion (e.g., A2-2) selected from the two subregions A2-1 and A2-2 included in the second region A2 of the upper LGP 210 and the third light source block corresponding region B3. A plurality of light output patterns 234a are formed in an overlapping region of a subregion (e.g., A1-2) selected from the two subregions A1-1 and A 1-2 included in the first region A1 of the upper LGP 210 and the fourth light source block corresponding region B4, and a plurality of light output patterns 234b are formed in an overlapping region of a subregion (e.g., A2-1) selected from the two subregions A2-1 and A2-2 included in the second region A2 of the upper LGP 210 and the fourth light source block corresponding region B4. Likewise, a plurality of light output patterns 261a through 264a and 261b through 264b are formed in the lower LGP 240.

As in the first exemplary embodiment, in the second exemplary embodiment, a light output region of any one LGP should not overlap light output regions of the other LGPs. Also, when the LGPs are viewed from the display panel unit, light output patterns should appear to be formed in the whole surface of the LGPs as a whole.

Accordingly, in the drawing for the current embodiment, the light output patterns 231a through 234a and 231b through 2134b are alternately arranged in the upper LGP 210, and the light output patterns 261 through 264a and 261b and 264b are alternately arranged in the lower LGP 240. Here, the light output patterns 231a through 234a and 231b and 234b of the upper LGP 210 do not overlap the light output patterns 261a through 264a and 261b through 264b of the lower LGP 240. The present invention is not limited to the current embodiment and its drawing. Regions in which light output patterns are formed can be changed as desired as long as the above condition for forming light output patterns is satisfied.

Dividing each of the LGPs 210 and 240 and forming light output patterns according to the current exemplary embodiment may cause rays of light incident on the LGPs 210 and 240 to propagate in paths indicated by arrows in FIG. 6. Therefore, as in the first exemplary embodiment, the light source blocks 221a through 224a, 221b through 224b, 251a through 254a, and 251b through 254b may correspond respectively to 4×4 light-emitting blocks, and accordingly, the backlight unit 600 according to the current exemplary embodiment can be driven as the 4×4 light-emitting blocks.

Figure 15:
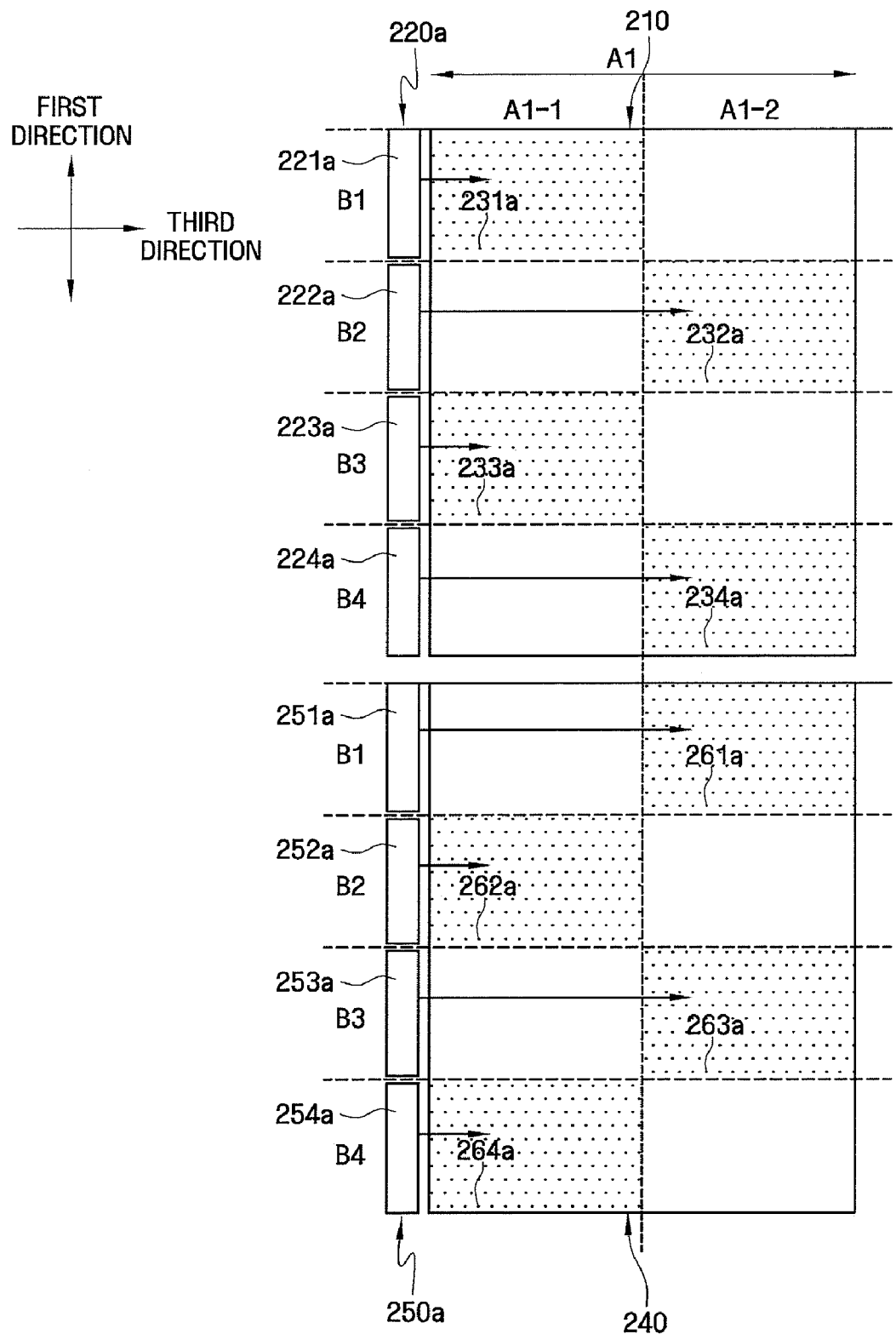
FIG. 15 is a plan view of a backlight unit according to another modified example of an exemplary embodiment of the present invention.

In the current exemplary embodiment, if a light source unit is disposed on only a side of each LGP, that is, if any one of the first and second upper light source units 220a and 220b shown in FIG. 6 and if any one of the first and second lower light source units 250a and 250b shown in FIG. 6 exist, it is apparent to one skilled in the art from the above descriptions that each of the LGPs 210 and 240 has any one of the first region A and the second region A2 in the third direction. Accordingly, any one of the light output patterns 231a through 234a and 261a through 264a may be formed, and any one of the light output patterns 231b through 234b and 261b through 264b may be formed. Consequently, the backlight unit 600 according to the current exemplary embodiment can be driven as 4×2 light-emitting blocks (M=2 and N=4). This structure is illustrated in FIG. 15.

Figure 7:
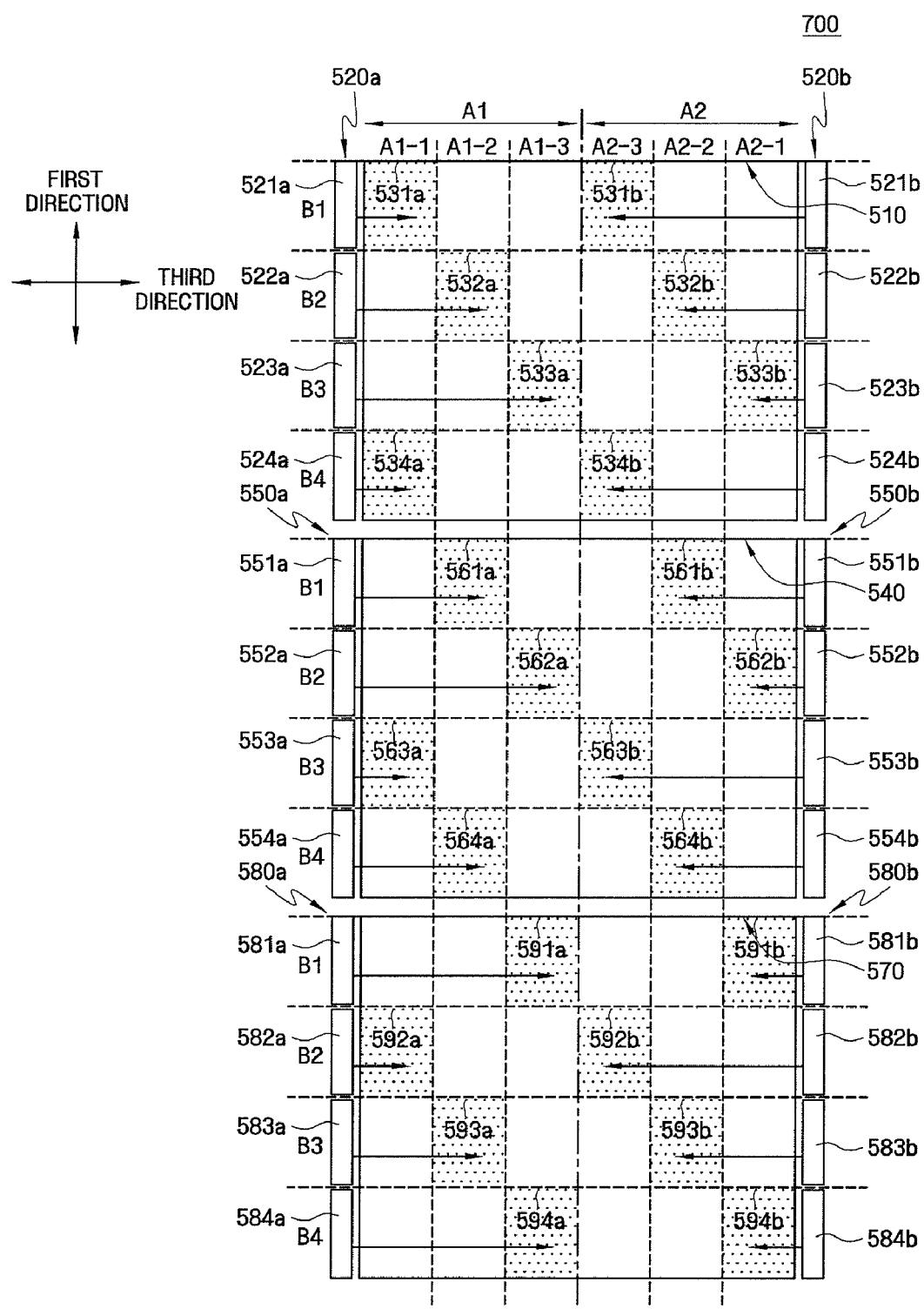
FIG. 7 is a plan view of a backlight unit according to a modified example of an exemplary embodiment of the present invention.

FIG. 7 is a plan view of a backlight unit 700 according to a modified example of the second exemplary embodiment of the present invention. In the plan view of FIG. 7, LGPs and light source blocks arranged in different layers are, for ease of description, illustrated as being parallel to each other. As in the drawings for the second modified example of the first exemplary embodiment, in the drawing for the current modified example of the second exemplary embodiment of the present invention, the structure of a backlight unit that can be driven as 4×6 light-emitting blocks is illustrated. For simplicity, elements substantially identical to those of the second modified example of the first exemplary embodiment are indicated by like reference numerals, and thus their description will be omitted.

Referring to FIG. 7, the backlight unit 700 according to the current modified example of the second exemplary embodiment has the same structure as the backlight unit 500 according to the second modified example of the first exemplary embodiment, except that each LGP is divided into regions arranged in a checkerboard form and that light output patterns are formed in these regions.

That is, the backlight unit 700 according to the current modified example of the second exemplary embodiment is the same as the backlight unit 500 according to the second modified example of the first exemplary embodiment in that it includes LGPs 510, 540 and 570 arranged in three different layers and light source units 520a, 520b, 550a, 550b, 580a and 580b disposed on both sides of the LGPs 510, 540 and 570, respectively, wherein each of the light source units 520a, 520b, 550a, 550b, 580a and 580b includes four light source blocks.

In addition, the backlight unit 700 according to the current modified example of the second exemplary embodiment is the same as the backlight unit 500 according to the second modified example of the first exemplary embodiment in that each of the LGPs 510, 540 and 570 is divided into two regions in the third direction, that is, a first region A1 located on a left side of each of the LGPs 510, 540 and 570 and a second region A2 located on a right side thereof and that each of the first region A1 and the second region A2 is divided again, in the third direction, into three subregions A1-1, A1-2 and A1-3 or A2-1, A2-2 and A2-3.

Furthermore, each of the LGPs 510, 540 and 570 according to the second exemplary embodiment is divided, in the first direction, into first through fourth light source block corresponding regions B1 through B4 which correspond respectively to light source blocks included in one light source unit.

Ultimately, each of the LGPs 510, 540 and 570 is divided into four rows and six columns of regions arranged in a checkerboard form.

The condition for forming light output patterns in the LGPs 510, 540 and 570 is as described above in the second exemplary embodiment of the present invention. In FIG. 7, a plurality of light output patterns 531a through 534a and 531b through 534b are alternatively arranged in the upper LGP 510, a plurality of light output patterns 561a through 564a and 561b through 564b are alternately arranged in the middle LGP 540, and a plurality of light output patterns 591a through 594a and 591b through 594b are alternately arranged in the lower LGP 570. However, the present invention is not limited to the current modified example. Regions in which light output patterns are formed can be changed as desired as long as the above condition for forming light output patterns is satisfied.

Dividing each of the LGPs 510, 540 and 570 and forming light output patterns according to the current modified example may cause rays of light incident on the LGPs 510, 540 and 570 to propagate in paths indicated by arrows in FIG. 7. Therefore, light source blocks 521a through 524a, 521b through 524b, 551a through 554a, 551b through 554b, 581a through 584a, and 581b through 584b may correspond respectively to 4×6 light-emitting blocks, and accordingly, the backlight unit 700 according to the current modified example can be driven as the 4×6 light-emitting blocks.

Figure 8A:
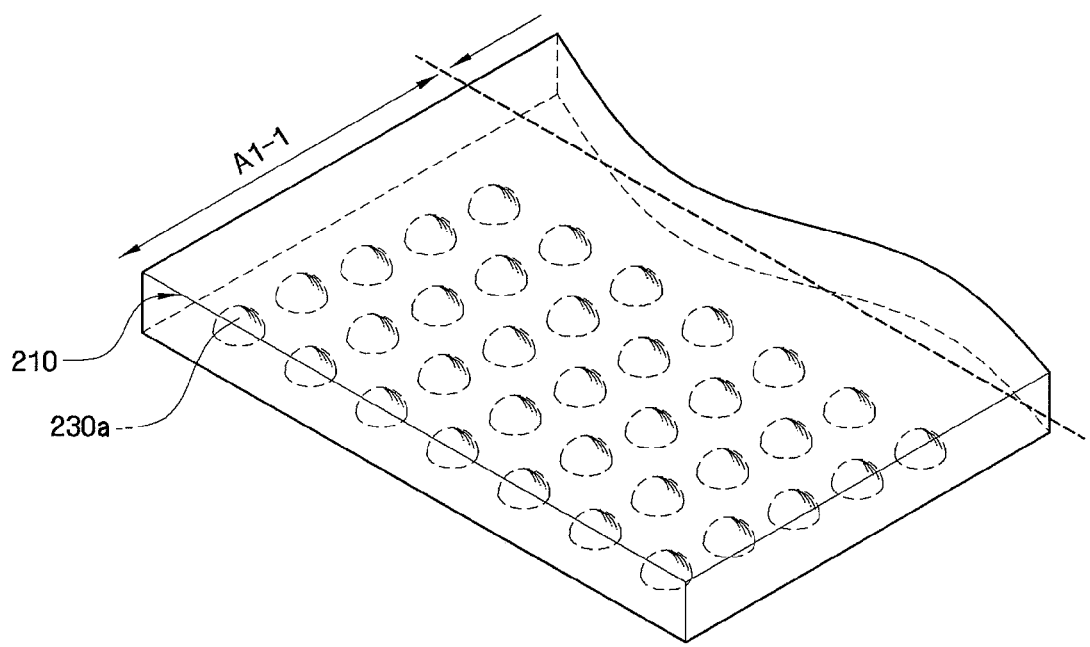
FIGS. 8A through 8C respectively are enlarged perspective, side, and plan views of light output patterns formed in a facing surface of an LGP.
Figure 8B:
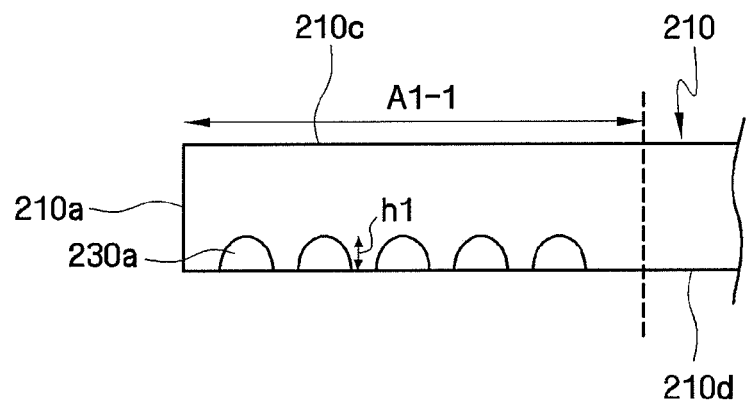
Figure 8C:
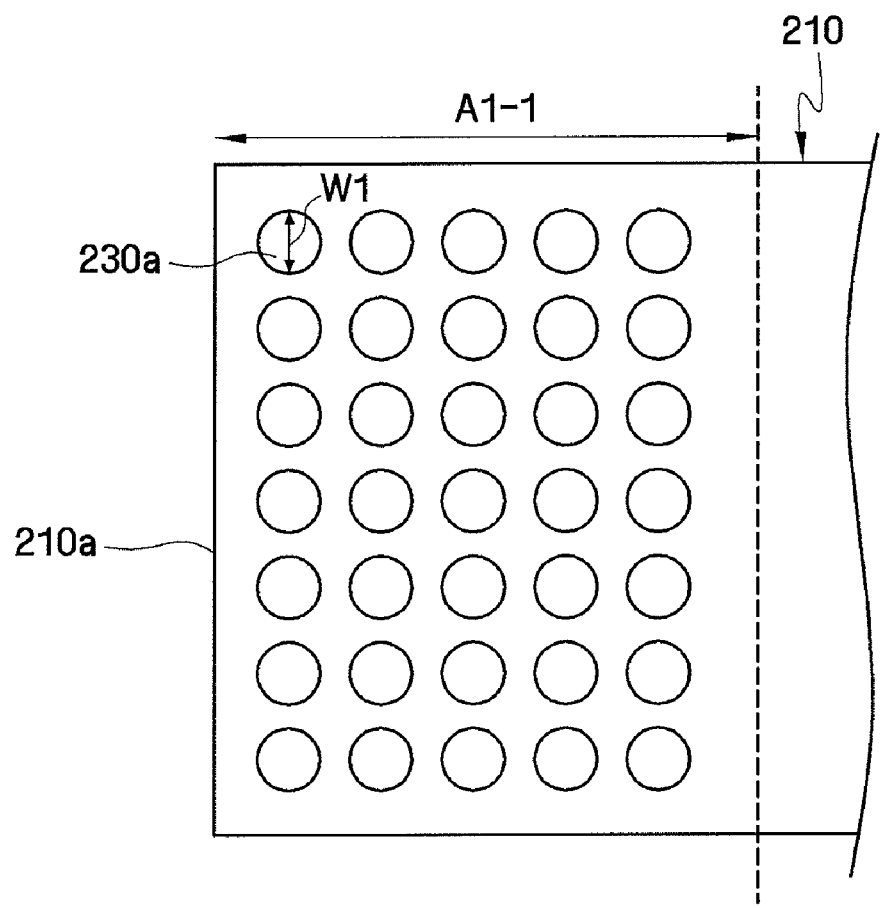
Figure 8D:
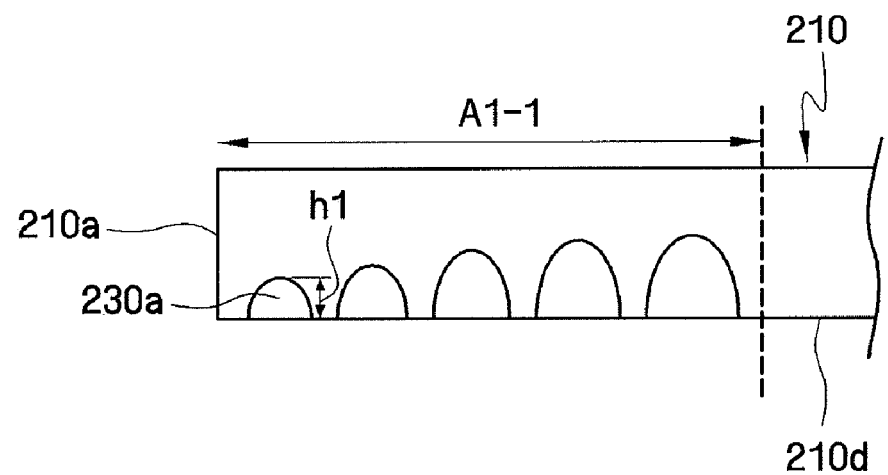
FIGS. 8D through 8F are side or plan views of modified examples of the light output patterns.
Figure 8E:
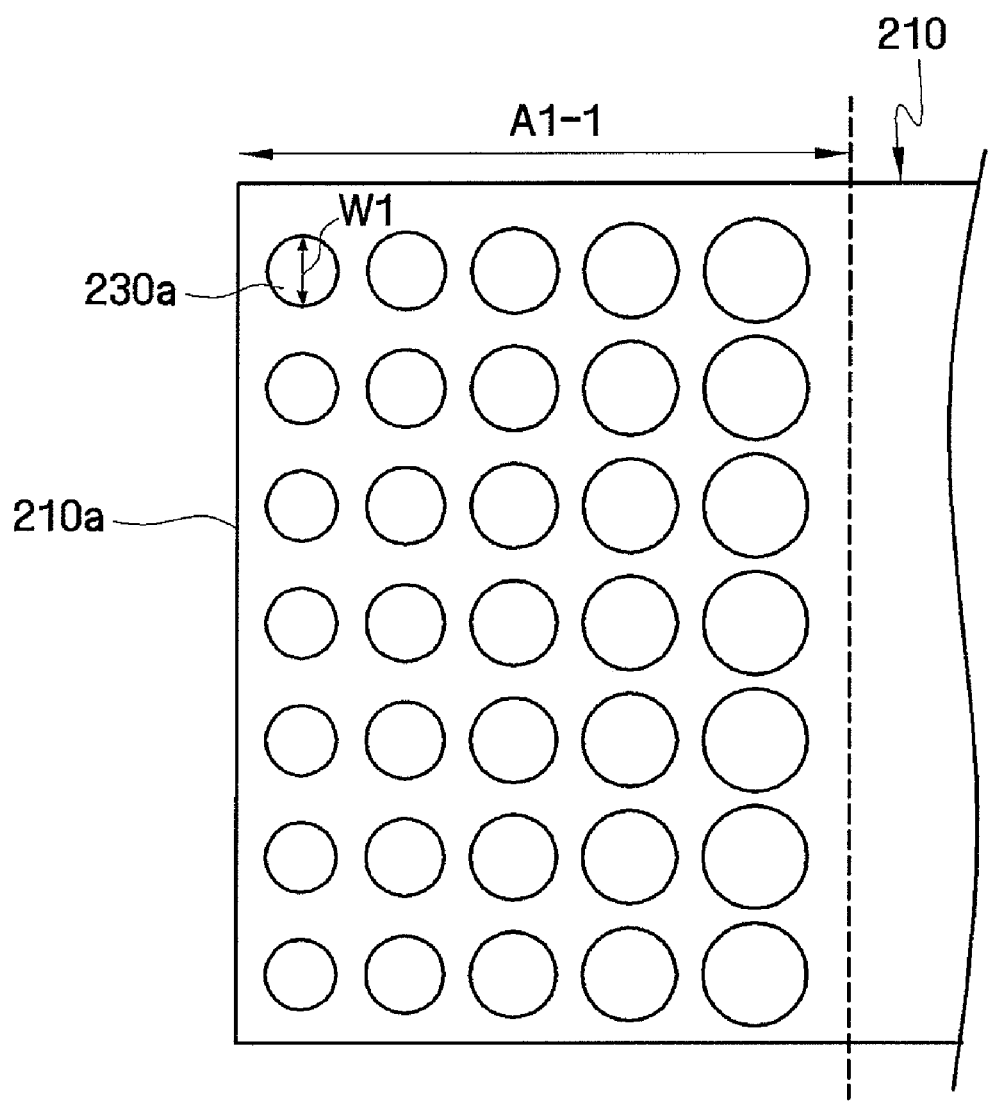
Figure 8F:
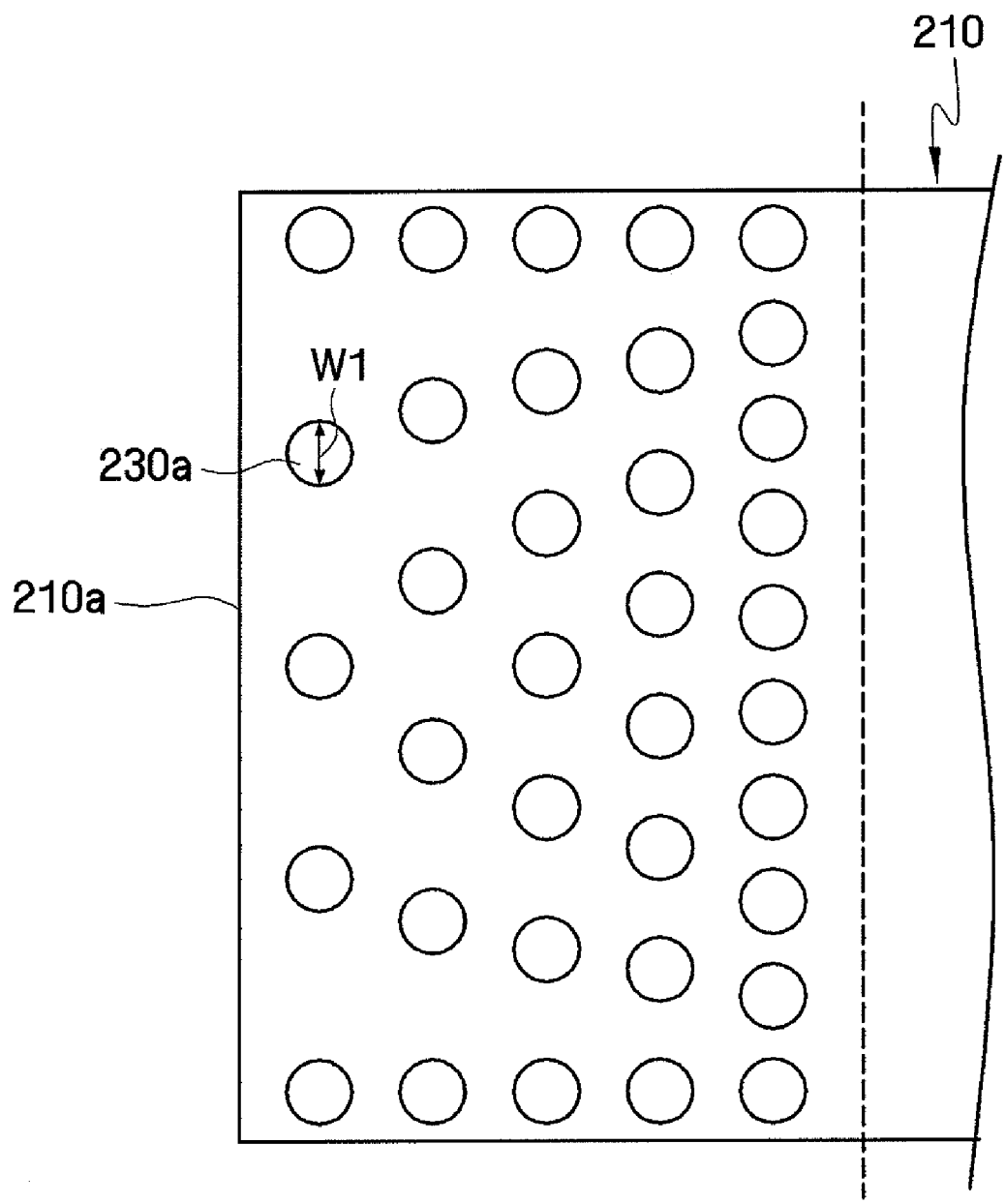

Light output patterns will now be described in more detail with reference to FIGS. 8A through 8F. FIGS. 8A through 8C respectively are enlarged perspective, side, and plan views of light output patterns formed in a facing surface of an LGP. FIGS. 8D through 8F are side or plan views of modified examples of the light output patterns. In these drawings, some of the light output patterns 230a formed in the subregion A1-1 of the upper LGP 210 according to the first exemplary embodiment are enlarged for ease of description. However, the present invention is not limited thereto, and it is apparent to those of ordinary skill in the art from the above descriptions that the light output patterns 230a illustrated in the drawings can also be applied to other exemplary embodiments of the present invention.

Referring to FIGS. 8A through 8C, the light output patterns 230a are formed in the facing surface 210d of the LGP 210 and each have a reflective surface that faces the light incident surface 210a. The light output patterns 230a may be concave in the direction of the light output surface 210c. Conversely, the light output patterns 230a may be convex in the opposite direction of the light output surface 210c. As described above, the light output patterns 230a can also be fondled in the light output surface 210c. In this case, the light output patterns 230a may be concave in the direction of the facing surface 210d or may be convex in the opposite direction of the facing surface 210d.

If the surface of the LGP 210 is a mirror surface, total reflection of light occurs. When the light output patterns 230a are formed in a predetermined region, e.g., the subregion A1-1, of the facing surface 210d of the LGP 210, light is reflected off the reflective surface of each of the light output patterns 230a and is directed to the light output surface 210c. Therefore, the light is intensively output from the region in which the light output patterns 230a are formed.

The light output patterns 230a can be readily formed by, for example, printing, laser processing, or the like.

In the current drawings, the light output patterns 230a are hemispherical and are arranged in a matrix form. However, the present invention is not limited thereto, and the shape, number, size, arrangement, density, and the like of the light output patterns 230a can vary widely. For example, while the light output patterns 230a are hemispherical in the current embodiment, they can have various three-dimensional (3D) shapes such as pyramids, polyprisms, prisms, and the like. Accordingly, the cross section or plane of each of the light output patterns 230a may have various shapes such as, for example, squares, triangles, and the like. In addition, the light output patterns 230a may be, for example, alternately arranged in a zigzag form or may be randomly arranged, instead of being arranged in a matrix form.

To enhance luminance uniformity, the width, height, and density of the light output patterns 230a in one light output region may be adjusted as follows.

Generally, luminance is reduced as the distance from the light incident surface 210a increases. Thus, to enhance luminance at a point located far from the light incident surface 210a, at least one of the width w1, height h1, and density (the number of the light output patterns 230a formed per unit area) of the light output patterns 230a formed in one light output region may be increased.

That is, referring to FIG. 8D, the height h1 of the light output patterns 230a may increase as the distance from the light incident surface 210a increases.

Alternatively, referring to FIG. 8E, the width w1 of the light output patterns 230a in the direction of the light incident surface 210a may increase as the distance from the light incident surface 210a increases.

Alternatively, referring to FIG. 8F, the density of the light output patterns 230a may increase as the distance from the light incident surface 210a increases.

In either of the above cases, even if the distance from the light incident surface 210a increases, the reflectivity of light at the light output patterns 230a increases, thereby improving light efficiency. Hence, uniform luminance can be maintained across the whole surface of the LGP 210.

In the first exemplary embodiment and its modified examples and the second exemplary embodiment and its modified examples, a case where light incident on an LGP from a light source block proceeds in a direction perpendicular to a light incident surface, that is, in the third direction (indicated by an arrow in the above-described plan views) has been described. In fact, however, light incident on the LGP from the light source block is diffused laterally to some degree while proceeding in the direction perpendicular to the light incident surface. As described above, light source blocks define rows of light-emitting blocks. However, if light incident from the light source blocks is diffused laterally, the rows of light-emitting blocks cannot be clearly defined. For this reason, predetermined patterns (hereinafter, referred to as light guide patterns), which make light incident from a light source block proceed straight, may be additionally formed in each LGP according to the first exemplary embodiment and its modified examples or the second exemplary embodiment and its modified examples. Hereinafter, examples of light guide patterns formed in a backlight unit according to the present invention will be described with reference to FIGS. 9 through 12.

Figure 9A:
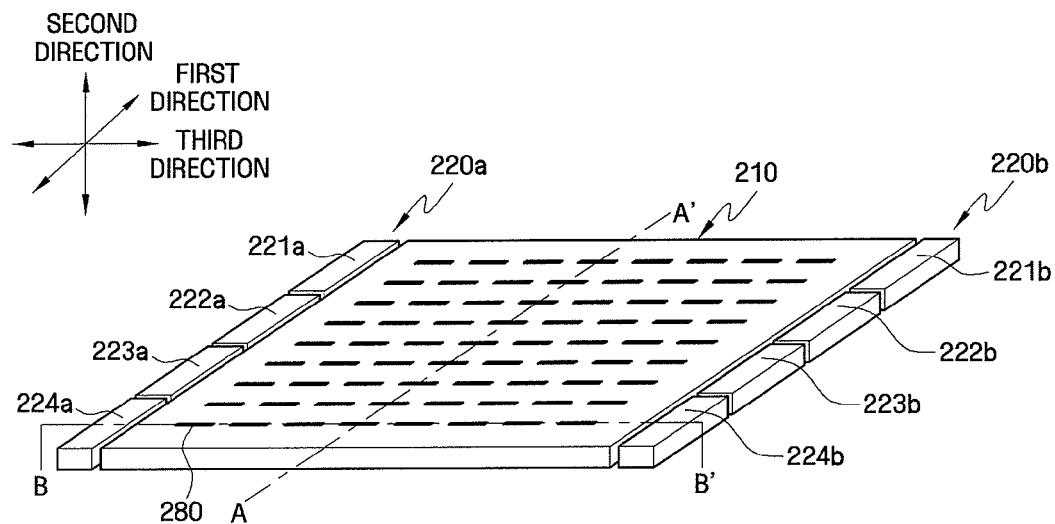
FIGS. 9A through 9C respectively are a perspective view of light guide patterns formed in a backlight unit according to an exemplary embodiment of the present invention, a cross-sectional view of the light guide patterns taken along the line A-A' of the perspective view, and a cross-sectional view of the light guide patterns taken along the line B-B' of the perspective view.
Figure 9B:
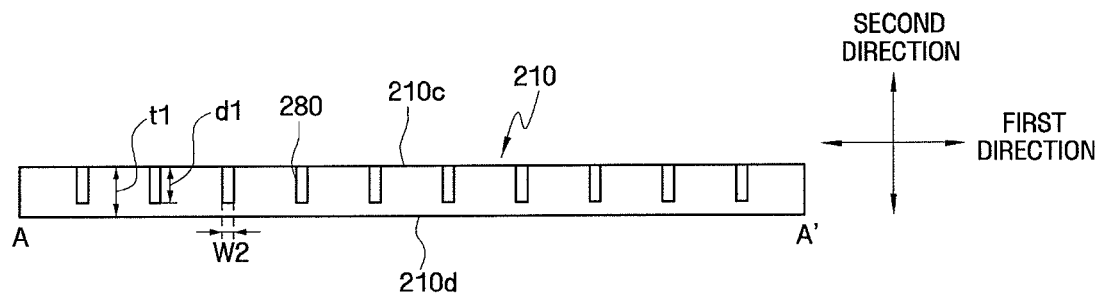
Figure 9C:
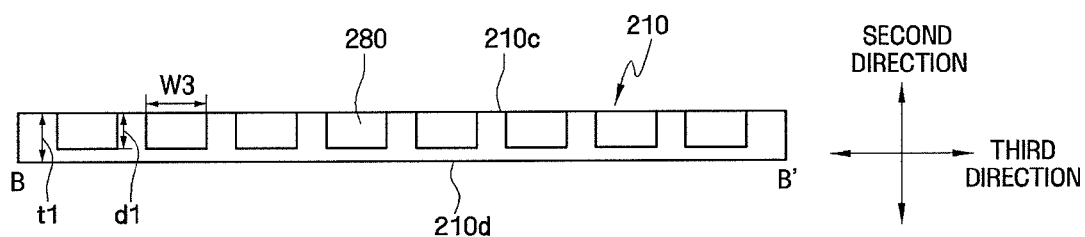
Figure 9D:
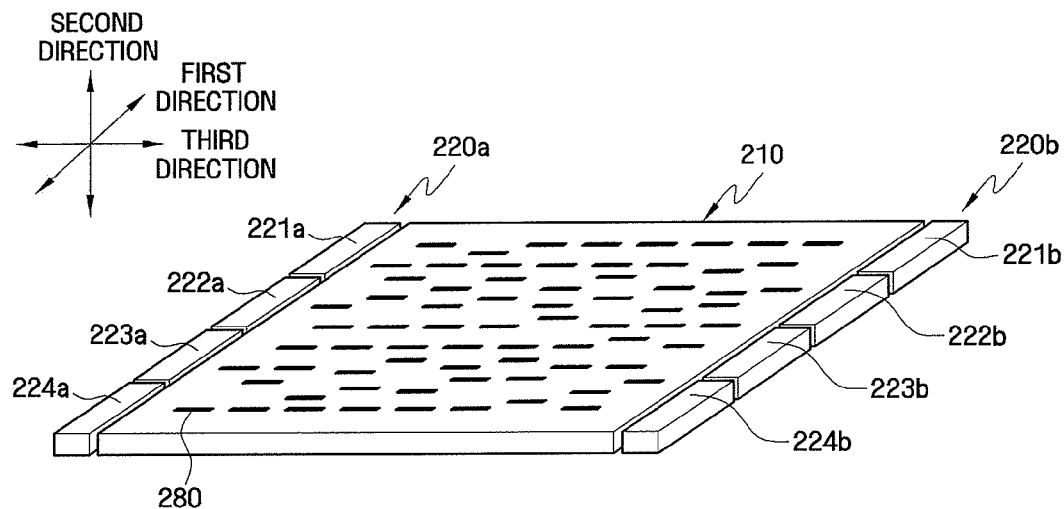
FIG. 9D is a perspective view of light guide patterns formed in a backlight unit according to an exemplary embodiment of the present invention.

FIGS. 9A through 9C respectively are a perspective view of a plurality of light guide patterns 280 formed in a backlight unit according to an exemplary embodiment of the present invention, a cross-sectional view of the light guide patterns 280 taken along the line A-A' of the perspective view, and a cross-sectional view of the light guide patterns 280 taken along the line B-B' of the perspective view. In these drawings, the light guide patterns 280 are formed in the upper LGP 210 of the backlight unit 200 according to the first exemplary embodiment. However, the present invention is not limited thereto, and it is apparent to those of ordinary skill in the art from the above descriptions that the light guide patterns 280 illustrated in the drawings can also be applied to other exemplary embodiments of the present invention.

Referring to FIGS. 9A through 9C, the light guide patterns 280 reflect light incident on the LGP 210 to prevent the light from being diffused laterally. In the current exemplary embodiment, the light guide patterns 280 are formed in the light output surface 210c in the direction of the facing surface 210d. Conversely, the light guide patterns 280 can also be formed in the facing surface 210d in the direction of the light output surface 210c. This case is the same, in the shape of the light guide patterns 280, as the case where the light guide patterns 280 are formed in the light output surface 210c in the direction of the light output surface 210d, and only the surface in which the light guide patterns 280 are formed is changed from the light output surface 210c to the facing surface 210d.

The light guide patterns 280 are relatively long in a direction perpendicular to the light incident surface 210a, that is, the third direction and is relatively narrow in a direction parallel to the light incident surface 210a, that is, the first direction. The width of the light guide patterns 280 in the third direction is indicated by reference character w3, and the width of the light guide patterns 280 in the first direction is indicated by w2. In addition, a depth d1 of the light guide patterns 280 is smaller than the thickness t1 of the LGP 210 in the second direction. The reason why the thickness w3 of the light guide patterns 280 in the third direction is greater than the width w2 of the light guide patterns 280 in the first direction is to make light proceed straight in the third direction. In addition, the reason why the depth d1 of the light guide patterns 280 is smaller than the thickness t1 of the LGP 210 is to prevent an increase of bright lines due to the light guide patterns 280.

The light guide patterns 280 are formed over the entire region of the LGP 210. Here, the light guide patterns 280 are not connected to each other and, particularly, are parallel to each other. In the current exemplary embodiment, the light guide patterns 280 are arranged in a matrix form, that is, are arranged in a line in the third direction and are arranged parallel to each other at regular intervals in the first direction. However, the present invention is not limited thereto, and the arrangement of the light guide patterns 280 may vary. For example, the light guide patterns 280 may be randomly arranged while satisfying the condition that they are not connected to each other but are parallel to each other (see FIG. 9D). When the light guide patterns 280 are arranged randomly, an increase of bright lines due to the light guide patterns 280 can be prevented.

In the current exemplary embodiment, the cross sections of the light guide patterns 280 taken along the lines A-A' and B-B' are square. However, the present invention is not limited thereto, and the cross-sectional shape of the light guide patterns 280 may vary. That is, the cross-sections of the light guide patterns 280 may be, for example, streamlined, diamond-shaped, oval, or the like. The cross-sectional shape of the light guide patterns 280 is not limited to any particular shape as long as the width w3 of the light guide patterns 280 in the third direction is greater than the width w2 thereof in the first direction. The light guide patterns 280 can be readily formed by, for example, printing, laser processing, or the like.

When light guide patterns are formed in an LGP as described above, it can be ensured that light output from a light source block proceeds straight, as compared with when the light guide patterns are not formed. This effect of the light guide patterns is well demonstrated in a comparative example of FIGS. 10A and 10B and an experimental example of FIGS. 10C and 10D.

Figure 10A:
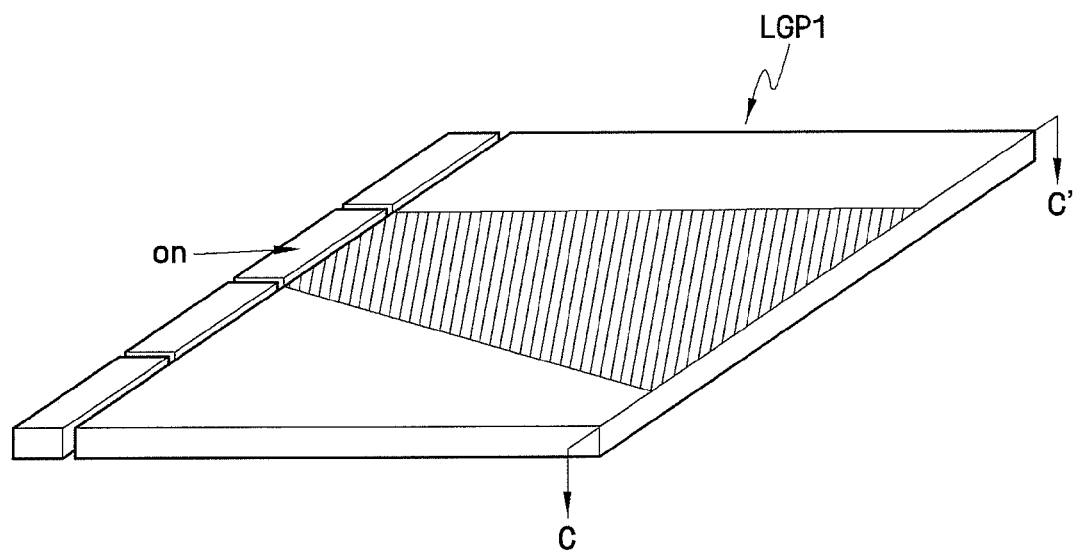
FIGS. 10A through 10D are diagrams for comparing light distribution in an LGP in which light guide patterns are not formed with light distribution in an LGP in which light guide patterns are formed.
Figure 10B:
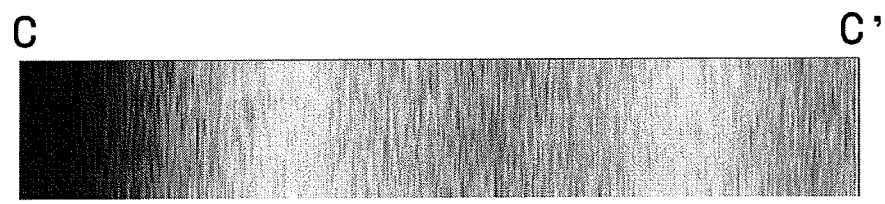

FIG. 10A illustrates light distribution expected in an LGP LGP1, in which light guide patterns are not formed, when any one light source block (indicated by an arrow) is turned on. FIG. 10B is a photograph showing actual light distribution measured at a cross section along the line C-C' of FIG. 10A.

Figure 10C:
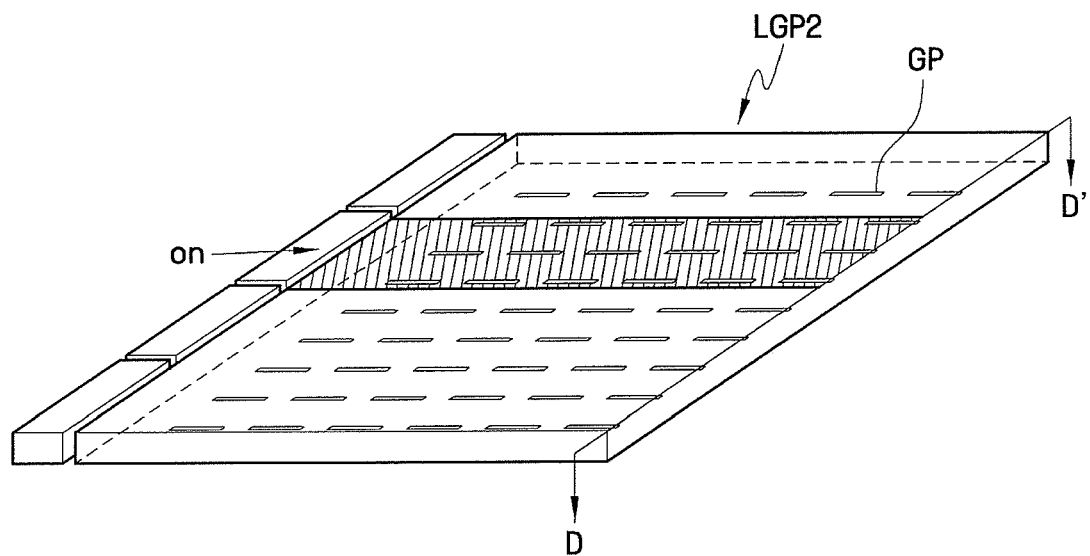
Figure 10D:
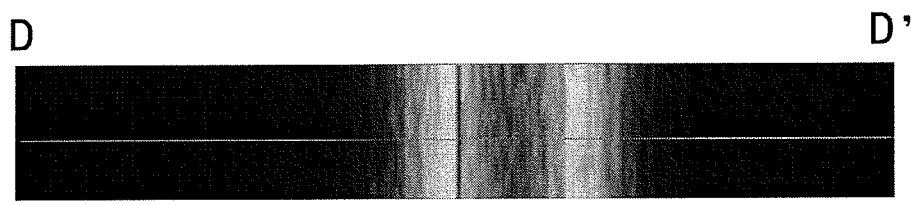

FIG. 10C illustrates light distribution expected in an LGP LGP2, in which light guide patterns GP identical to those illustrated in FIGS. 9A through 9D are formed, when any one light source block (indicated by an arrow) is turned on. FIG. 10D is a photograph showing actual light distribution measured at a cross section along the line D-D' of FIG. 10C.

Referring to FIGS. 10A through 10D, light distribution in the experimental example of FIGS. 10C and 10D is narrower than that in the comparative example of FIGS. 10A and 10B. This denotes that light proceeded straight, not laterally, in the experimental example of FIGS. 10C and 10D.

Although not shown in FIGS. 9A through 9D, the light output patterns 230a and 230b are already formed in the facing surface 210d of the upper LGP 210 (see FIGS. 2A through 2C). Therefore, the light guide patterns 280 may be formed to not overlap the light output patterns 230a and 230b in the second direction. Particularly, when the light guide patterns 280 are formed in the same surface as the light output patterns 230a and 230b, for example, in the facing surface 210d, the light guide patterns 280 may be formed between the light output patterns 230a and 230b such that they do not touch the light output patterns 230a and 230b.

Figure 11A:
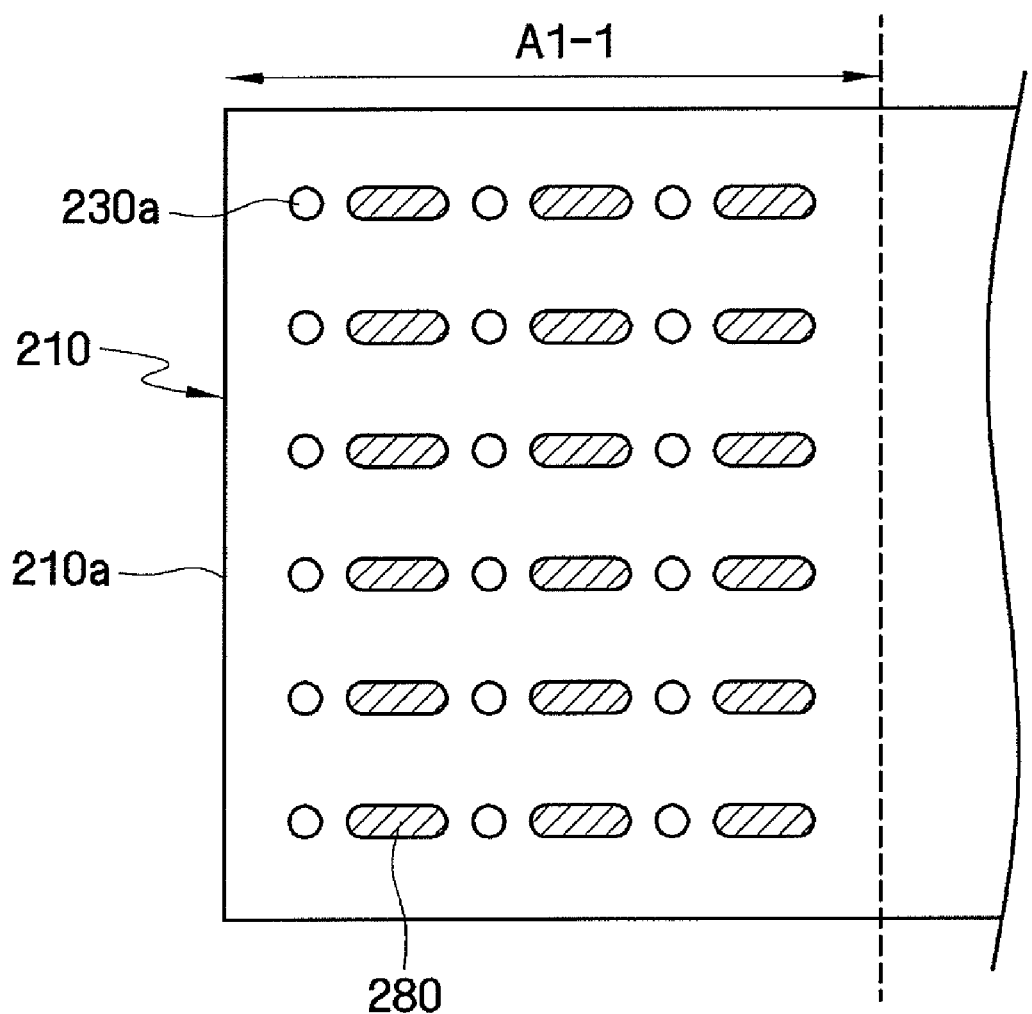
FIGS. 11A and 11B are plan views illustrating examples of the arrangement of light output patterns and light guide patterns.
Figure 11B:
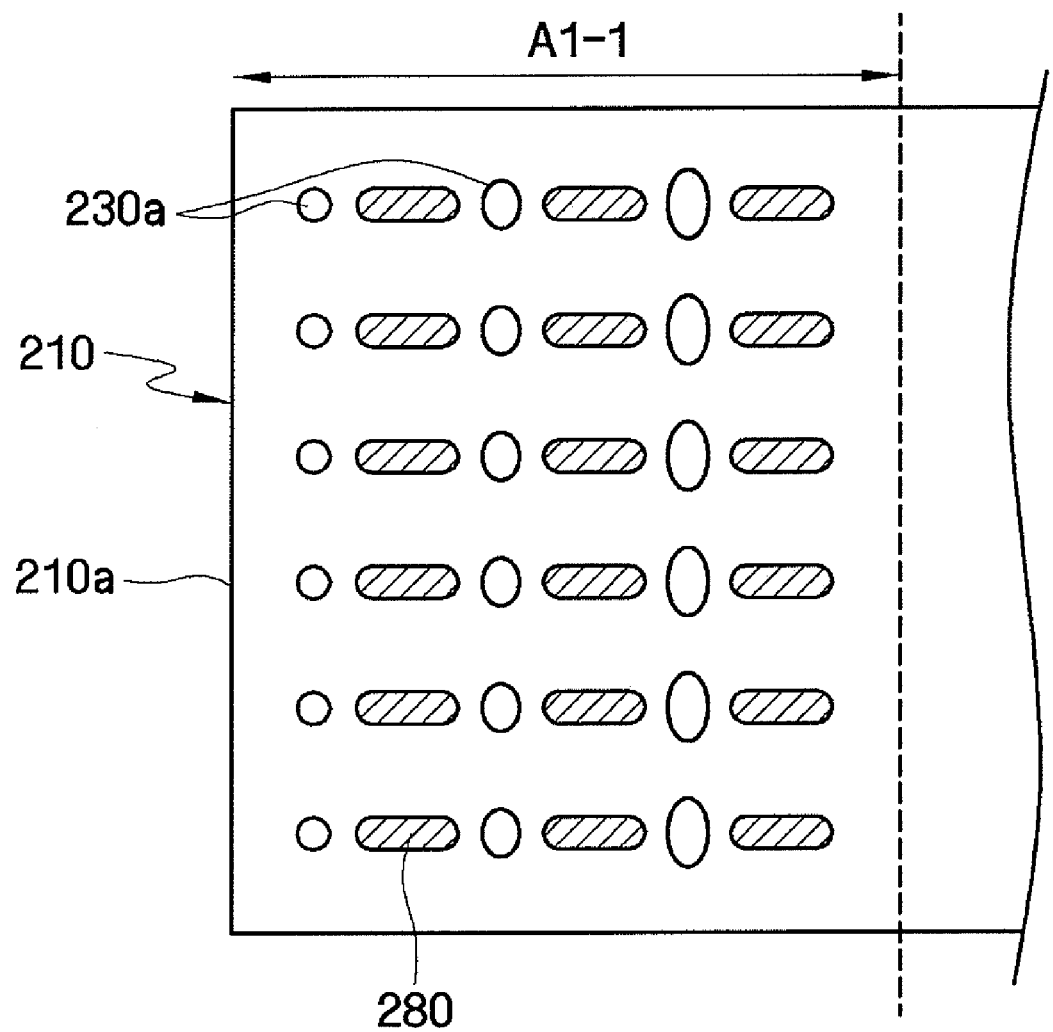

FIGS. 11A and 11B are plan views two-dimensionally illustrating examples of the arrangement of the light output patterns 230a and the light guide patterns 280. In these drawings, the light output patterns 230a and the light guide patterns 280 formed in the subregion A1-1 of the upper LGP 210 are enlarged. As described above, the light guide patterns 280 can be formed in the facing surface 210d while the light output patterns 230a are formed in the light output surface 210c, and vice versa. Alternatively, the light guide patterns 280 and the light output patterns 230a can all be formed in any one of the facing surface 210d and the light output surface 210c.

Referring to FIGS. 11A and 11B, the light guide patterns 280 and the light output patterns 230a are alternately arranged such that they do not contact each other.

Other than light guide patterns shaped as described above, various shapes of light guide patterns that can help light source blocks in defining rows of light-emitting blocks can be formed, which will now be described with reference to FIG. 12.

Figure 12:
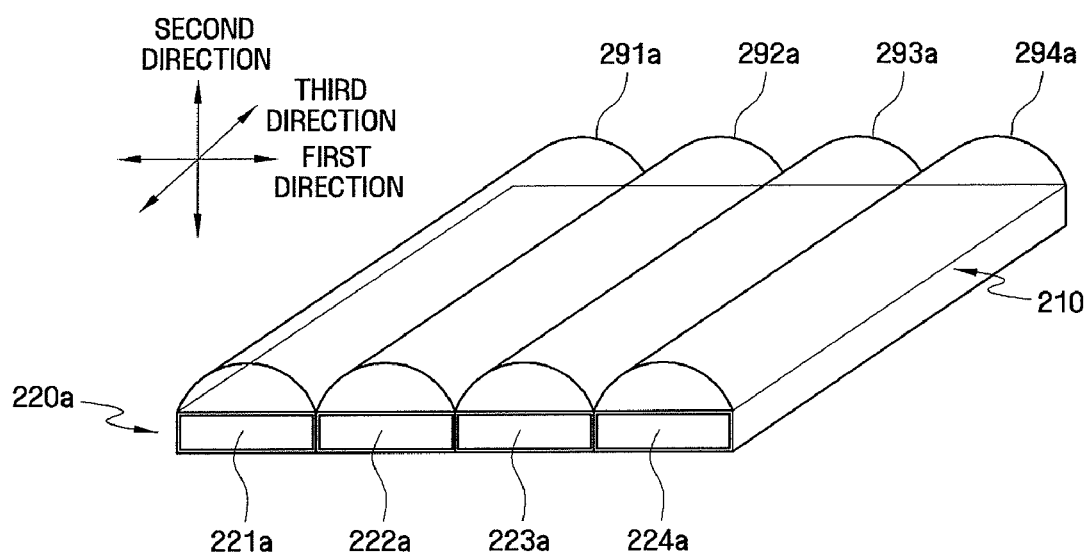
FIG. 12 is a perspective view of lenticular-type light guide patterns formed in a backlight unit according to an exemplary embodiment of the present invention.

FIG. 12 is a perspective view of lenticular-type light guide patterns 291a through 294a formed in a backlight unit according to an exemplary embodiment of the present invention. In the current drawing, the lenticular-type light guide patterns 291a through 294a are formed on the LGP 210 of the backlight unit 200 according to the first exemplary embodiment. However, the present invention is not limited thereto, and the lenticular-type light guide patterns 291a through 294a illustrated in the current drawing can also be applied to other exemplary embodiments of the present invention.

Referring to FIG. 12, N lenticular-type light guide patterns corresponding respectively to light source blocks included in one light source unit are formed on the whole surface of the LGP 210 in the first direction. For example, in the current exemplary embodiment, four lenticular-type light guide patterns 291a through 294a corresponding respectively to the light source blocks 221a through 224a included in the light source unit 220a are formed on the whole surface of the LGP 210.

Each of the lenticular-type light guide patterns 291a through 294a extends in the third direction and is shaped like a lens which is concave at both ends thereof and is convex in the middle in the first direction. The lenticular-type light guide patterns 291a through 294a may be made of the same material as the LGP 210.

Figure 16:
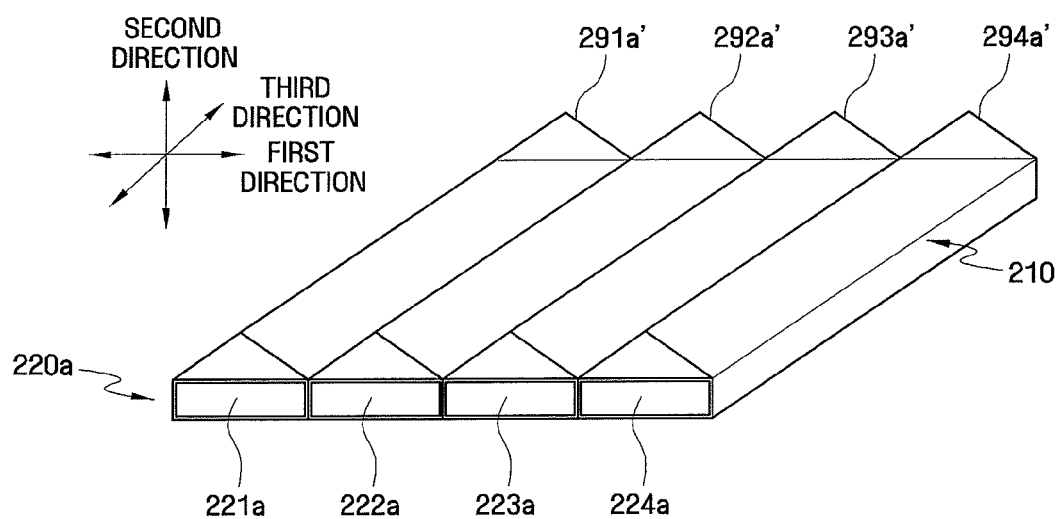
FIG. 16 is a perspective view of triangular prism-type patterns formed in a backlight unit according to an exemplary embodiment of the present invention.

When the lenticular-type light guide patterns 291a through 294a are formed, light incident on the LGP 210 may be mostly output from convex portions of the lenticular-type light guide patterns 291a through 294a but not from concave portions at both ends thereof. Consequently, like the above-described forms of light guide patterns, the lenticular-type light guide patterns 291a through 294a can clearly define rows of light-emitting blocks. Other than the lenticular-type light guide patterns 291a through 294a illustrated in FIG. 12, micropatterns such as prism-type patterns can also be employed as light guide patterns. An example of the micropatterns is illustrated in FIG. 16. FIG. 16 illustrates triangular prism-type patterns 291a' through 294a' employed as light guide patterns. In this case, light is output mostly from surfaces of the prism-type patterns 291a' through 294a' rather than corners thereof. Thus, like lenticular-type light guide patterns, the prism-type patterns 291a' through 294a' ensure that light proceeds straight.

FIGS. 13A through 13D are photographs showing an experimental example of local dimming in a backlight unit according to an exemplary embodiment of the present invention.

In the current experimental example, LGPs, each with a thickness of about 0.8 mm were arranged in two different layers, and eight light source blocks were placed on both side surfaces of each LGP. In addition, light output patterns identical to those illustrated in FIG. 4 were formed in a facing surface of each LGP, and light guide patterns identical to those illustrated in FIGS. 9A through 11B were formed in the facing surface of each LGP to not contact the light output patterns.

The photographs of FIGS. 13A through 13D show actual light distribution in the LGPs, which were formed according to the current experimental example, when the LGPs were viewed from thereabove. For ease of description, the light source blocks are also illustrated, and the light source blocks arranged in two layers are illustrated as being located in the same plane. Here, inner ones of the light source blocks disposed on both side surfaces of the LGPs are light source blocks disposed on both side surfaces of the upper LGP, and outer ones of the light source blocks are light source blocks disposed on both side surfaces of the lower LGP.

Figure 13A:
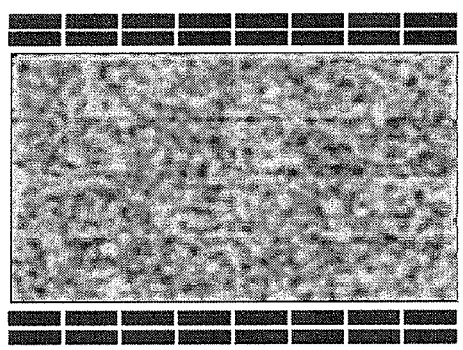
FIGS. 13A through 13D are photographs showing an experimental example of local dimming in a backlight unit according to an exemplary embodiment of the present invention.

Referring to FIG. 13A, the entire region of the LGPs as a whole is bright when all light source blocks are turned on.

Figure 13B:
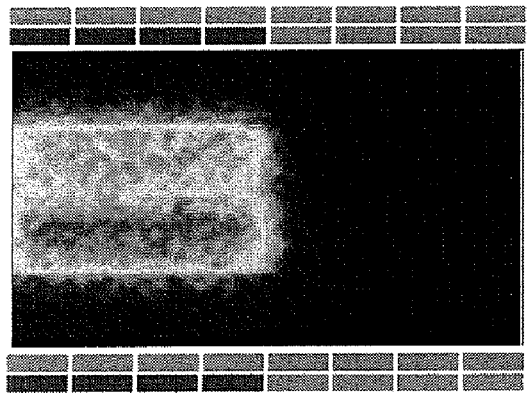
Figure 13C:
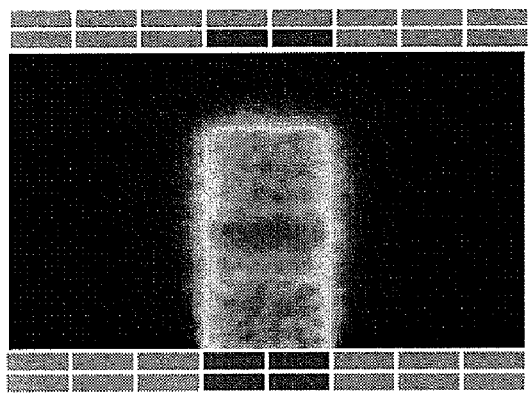
Figure 13D:
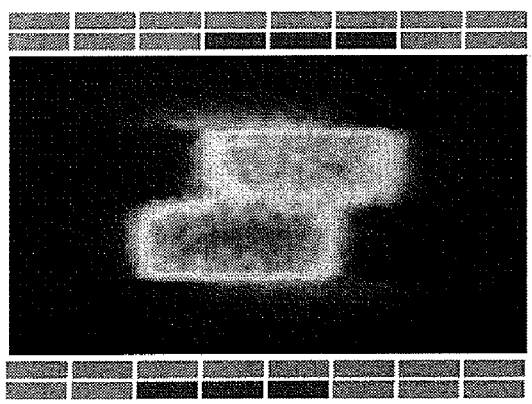

Referring to FIGS. 13B through 13D, when some of the light source blocks on both side surfaces of the upper LGP and some of the light source blocks disposed on both side surfaces of the lower LGP are turned on, only regions that the turned-on light source blocks are responsible for are bright.

Consequently, the backlight unit of the current experimental example can be driven as 8×4 light-emitting blocks.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A backlight unit comprising:
   a plurality of light guide plates (LGPs) arranged in M layers and separated from each other by a predetermined gap, wherein M is a natural number equal to or greater than two;
   a light source unit disposed on at least one side surface of each of the LGPs and comprising N light source blocks whose brightnesses are controlled individually, wherein N is a natural number equal to or greater than two; and
   a plurality of light output regions defined by each of the LGPs being divided into a plurality of regions according to a distance from the light source unit and by a plurality of light output patterns being formed in some of the regions,
   wherein the light output regions do not overlap each other in a stacking direction of the LGPs and are arranged to correspond to a whole surface of the LGPs.

2. The backlight unit of claim 1, wherein the light source unit is disposed on a side surface of each of the LGPs, and each of the LGPs is divided into M regions according to the distance from the light source unit.

3. The backlight unit of claim 2, wherein the backlight unit is driven as N×M light-emitting blocks.

4. The backlight unit of claim 1, wherein each of the LGPs is divided into a plurality of regions arranged in a checkerboard form by each of the LGPs being divided into N regions which correspond respectively to the light source blocks, and the light output regions are defined by the light output patterns being formed in some of the regions arranged in the checkerboard form.

5. The backlight unit of claim 1, wherein each of the LGPs comprises a light incident surface which is adjacent to the light source unit and on which light is incident, a light output surface which has an end connected to the light incident surface and from which light is output, and a facing surface which has an end connected to the light incident surface and faces the light output surface, wherein the light output patterns are formed in one of the light output surface and the facing surface of each of the LGPs.

6. The backlight unit of claim 5, wherein each of the light output patterns has a three-dimensional (3D) shape which is formed in the light output surface in a direction of the facing surface or in an opposite direction of the facing surface or has a 3D shape which is formed in the facing surface in a direction of the light output surface or in an opposite direction of the light output surface.

7. The backlight unit of claim 6, wherein at least one of a height, width, and density of the light output patterns increases as a distance from the light incident surface increases.

8. The backlight unit of claim 1, further comprising light guide patterns guiding light incident from the light source unit to proceed in a direction perpendicular to the side surface of each of the LGPs.

9. The backlight unit of claim 8, wherein each of the LGPs comprises a light incident surface which is adjacent to the light source unit and on which light is incident, a light output surface which has an end connected to the light incident surface and from which light is output, and a facing surface which has an end connected to the light incident surface and faces the light output surface, and the light guide patterns are formed in each of the LGPs, wherein each of the light guide patterns is formed in the light output surface in the direction of the facing surface or formed in the facing surface in the direction of the light output surface to reflect light, and a width of each of the light guide patterns in a direction perpendicular to the light incident surface is greater than a width thereof in a direction parallel to the light incident surface while a width of each of the light guide patterns in a thickness direction of the LGPs is smaller than a thickness of each of the LGPs.

10. The backlight unit of claim 9, wherein the light output patterns are formed in one of the light output surface and the facing surface of each of the LGPs, and the light guide patterns and the light output patterns do not contact each other.

11. The backlight unit of claim 8, wherein each of the LGPs comprises a light incident surface which is adjacent to the light source unit and on which light is incident, a light output surface which has an end connected to the light incident surface and from which light is output, and a facing surface which has an end connected to the light incident surface and faces the light output surface, and the light guide patterns comprise N prism patterns or N lenticular patterns which are formed on the light output surface of each of the LGPs and correspond respectively to the N light source blocks, wherein a cross section of each of the prism patterns or the lenticular patterns in the direction parallel to the light incident surface is convex in the middle while concave at both ends thereof, and the prism patterns or the lenticular patterns extend in the direction perpendicular to the light incident surface.

12. A backlight unit comprising:
a plurality of light guide plates (LGPs) arranged in M layers and separated from each other by a predetermined gap, wherein M is a natural number equal to or greater than two;
a first light source unit and a second light source unit disposed respectively on two facing side surfaces of each of the LGPs and each of the first and second light source units comprising N light source blocks whose brightnesses are controlled individually, wherein N is a natural number equal to or greater than two; and
a plurality of light output regions defined by each of the LGPs being divided into a first region close to the first light source unit and a second region close to the second light source unit, by each of the first region and the second region being divided into a plurality of subregions according to a distance from a corresponding one of the first and second light source units, and by a plurality of light output patterns being formed in some of the subregions,
wherein the light output regions do not overlap each other in a stacking direction of the LGPs and are arranged to correspond to a whole surface of the LGPs.

13. The backlight unit of claim 12, wherein each of the first and second regions is divided into M subregions according to the distance from the corresponding one of the first and second light source units.

14. The backlight unit of claim 13, wherein the backlight unit is driven as N×2M light-emitting blocks.

15. The backlight unit of claim 12, wherein each of the LGPs is divided into a plurality of regions arranged in a checkerboard form by each of the LGPs being divided into N regions which correspond respectively to the light source blocks, and the light output regions are defined by the light output patterns being formed in some of the regions arranged in the checkerboard form.

16. The backlight unit of claim 12, wherein each of the LGPs comprises first and second light incident surfaces which are respectively adjacent to the first and second light source units and on which light is incident, a light output surface which has both ends connected respectively to the first and second light incident surfaces and from which light is output, and a facing surface which has both ends connected respectively to the first and second light incident surfaces and faces the light output surface, wherein the light output patterns are formed in one of the light output surface and the facing surface of each of the LGPs.

17. The backlight unit of claim 16, wherein each of the light output patterns has a three-dimensional (3D) shape which is formed in the light output surface in a direction of the facing surface or in an opposite direction of the facing surface or has a 3D shape which is formed in the facing surface in a direction of the light output surface or in an opposite direction of the light output surface.

18. The backlight unit of claim 17, wherein at least one of a height, width, and density of the light output patterns formed in the first region increases as a distance from the first light incident surface increases, and at least one of a height, width, and density of the light output patterns formed in the second region increases as a distance from the second light incident surface increases.

19. The backlight unit of claim 12, further comprising light guide patterns guiding light incident from the first and second light source units to proceed in a direction perpendicular to the side surfaces of each of the LGPs.

20. The backlight unit of claim 19, wherein each of the LGPs comprises first and second light incident surfaces which are respectively adjacent to the first and second light source units and on which light is incident, a light output surface which has both ends connected respectively to the first and second light incident surfaces and from which light is output, and a facing surface which has both ends connected respectively to the first and second light incident surfaces and faces the light output surface, and the light guide patterns are formed in each of the LGPs, wherein each of the light guide patterns is formed in the light output surface in the direction of the facing surface or formed in the facing surface in the direction of the light output surface to reflect light, and a width of each of the light guide patterns in a direction perpendicular to the first and second light incident surfaces is greater than a width thereof in a direction parallel to the first and second light incident surfaces while a width of each of the light guide patterns in a thickness direction of the LGPs is smaller than a thickness of each of the LGPs.

21. The backlight unit of claim 20, wherein the light output patterns are formed in one of the light output surface and the facing surface of each of the LGPs, and the light guide patterns and the light output patterns do not contact each other.

22. The backlight unit of claim 19, wherein each of the LGPs comprises first and second light incident surfaces which are respectively adjacent to the first and second light source units and on which light is incident, a light output surface which has both ends connected respectively to the first and second light incident surfaces and from which light is output, and a facing surface which has both ends connected respectively to the first and second light incident surfaces and faces the light output surface, and the light guide patterns comprise N prism patterns or N lenticular patterns which are formed on the light output surface of each of the LGPs and correspond respectively to the N light source blocks, wherein a cross section of each of the prism patterns or the lenticular patterns in the direction parallel to the first and second light incident surfaces is convex in the middle while concave at both ends thereof, and the prism patterns or the lenticular patterns extend in the direction perpendicular to the first and second light incident surfaces.

23. A backlight unit comprising:
a plurality of light guide plates (LGPs) arranged in M layers and separated from each other by a predetermined gap, wherein M is a natural number equal to or greater than two;
a light source unit disposed on at least one side surface of each of the LGPs and comprising N light source blocks whose brightnesses are controlled individually, wherein N is a natural number equal to or greater than two;
a plurality of light guide patterns formed in each of the LGPs and guiding light incident from the light source unit to proceed in a direction perpendicular to the side surface of each of the LGPs; and
a plurality of light output regions defined by each of the LGPs being divided into a plurality of regions according to a distance from the light source unit and by a plurality of light output patterns being formed in some of the regions,
wherein the light output regions do not overlap each other in a stacking direction of the LGPs and are arranged to correspond to a whole surface of the LGPs.

24. The backlight unit of claim 23, wherein the light source unit comprises a first light source unit and a second light source unit disposed on two facing side surfaces of each of the LGPs, and each of the LGPs is divided into a first region close to the first light source unit and a second region close to the second light source unit, wherein each of the first region and the second region is divided into M subregions according to a distance from a corresponding one of the first and second light source units.

25. The backlight unit of claim 24, wherein the backlight unit is driven as N×2M light-emitting blocks.

* * * * *